(12) United States Patent
Brown

(10) Patent No.: US 12,234,011 B2
(45) Date of Patent: Feb. 25, 2025

(54) CONVERTIPLANE WITH STOPPED ROTORS, AND REPOSITIONABLE ROTOR BLADES

(71) Applicant: Gerald E. Brown, McLean, VA (US)

(72) Inventor: Gerald E. Brown, McLean, VA (US)

( * ) Notice: Subject to any disclaimer, the term of this patent is extended or adjusted under 35 U.S.C. 154(b) by 52 days.

(21) Appl. No.: 17/814,500

(22) Filed: Jul. 22, 2022

(65) Prior Publication Data

US 2023/0234703 A1 Jul. 27, 2023

Related U.S. Application Data

(60) Provisional application No. 63/228,224, filed on Aug. 2, 2021.

(51) Int. Cl.
*B64C 29/00* (2006.01)
*B64C 11/04* (2006.01)

(52) U.S. Cl.
CPC .......... *B64C 29/0025* (2013.01); *B64C 11/04* (2013.01)

(58) Field of Classification Search
CPC ..... B64C 29/0025; B64C 11/04; B64C 27/26; B64C 27/28; B64C 27/52; B64C 29/0033; B64C 29/02
See application file for complete search history.

(56) References Cited

U.S. PATENT DOCUMENTS

| | | | |
|---|---|---|---|
| 8,376,264 B1* | 2/2013 | Hong | B64C 27/10 244/17.23 |
| 9,540,103 B2* | 1/2017 | Long | B64C 27/32 |
| 2015/0028597 A1* | 1/2015 | Eller | B64C 27/72 290/1 A |
| 2016/0347446 A1* | 12/2016 | Vetter | B64C 27/26 |

* cited by examiner

*Primary Examiner* — Woody A Lee, Jr.
*Assistant Examiner* — Eric A Lange

(57) ABSTRACT

This invention is an aircraft of the type known as a "Convertiplane" which can conduct vertical flight operations in the manner of a rotor-wing aircraft and conduct cruise flight operations in the manner of a fixed-wing aircraft. This aircraft has rotor blades mounted on each wingtip and tilting propulsors mounted at the tips of the horizontal stabilizers on the aircraft tail. The wingtip mounted rotor blades and vertically oriented tail propulsors provide thrust for vertical takeoff. To transition to cruise flight, at sufficient airspeed, the wingtip rotors are stopped and moved from the rotorwing position to a "V" configuration extending out from the wingtips to function as ailerons, while the tail mounted propulsors are tilted forward from a vertical to a horizontal orientation to provide thrust for forward flight.

12 Claims, 18 Drawing Sheets

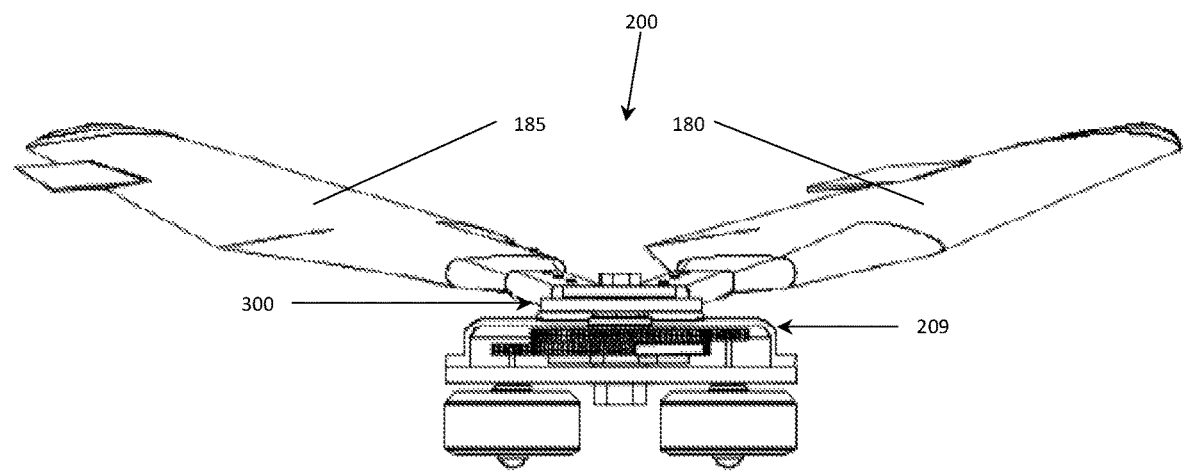
Figure 3
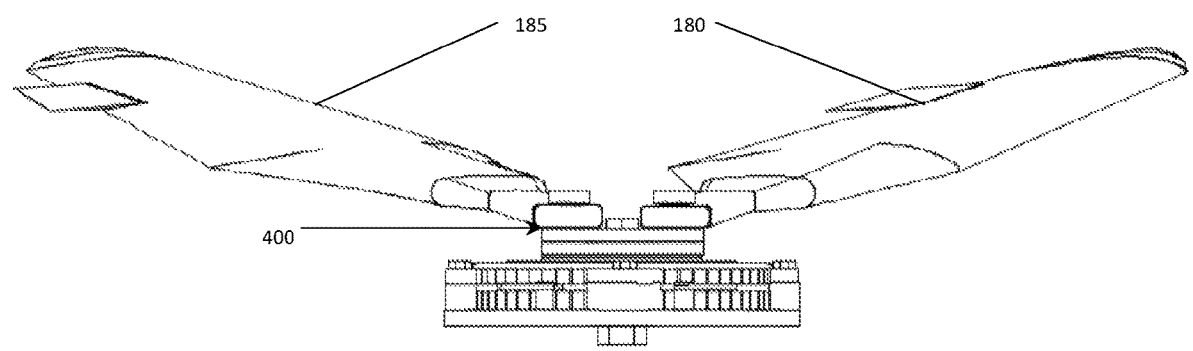
Figure 3.1

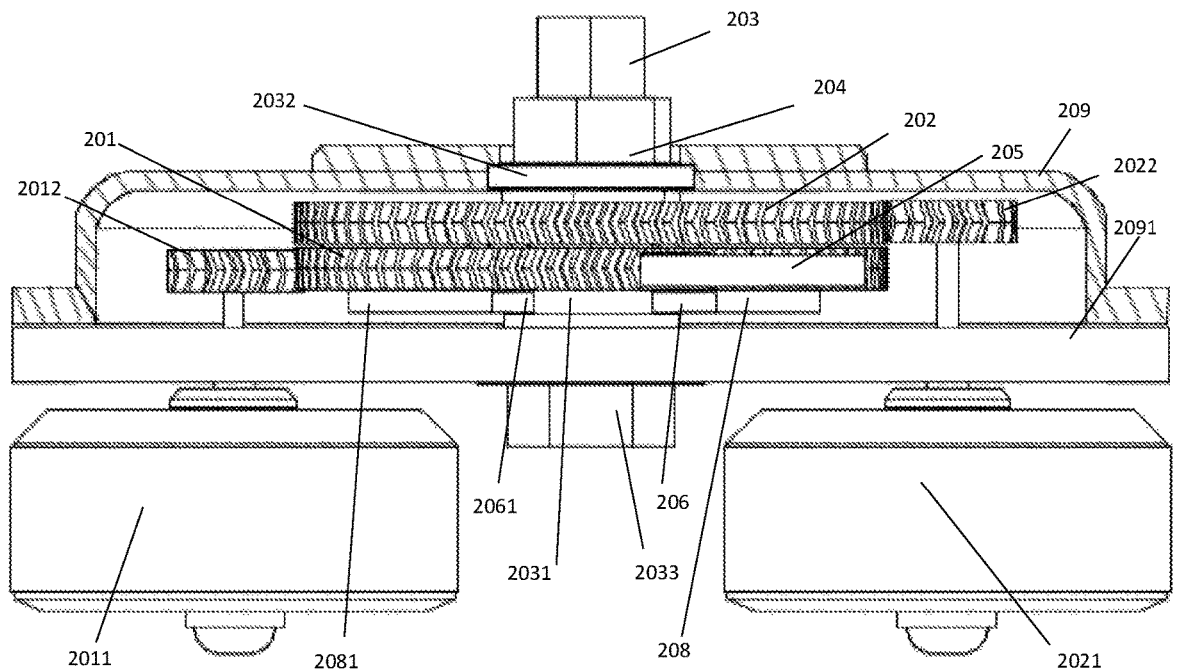
Figure 4
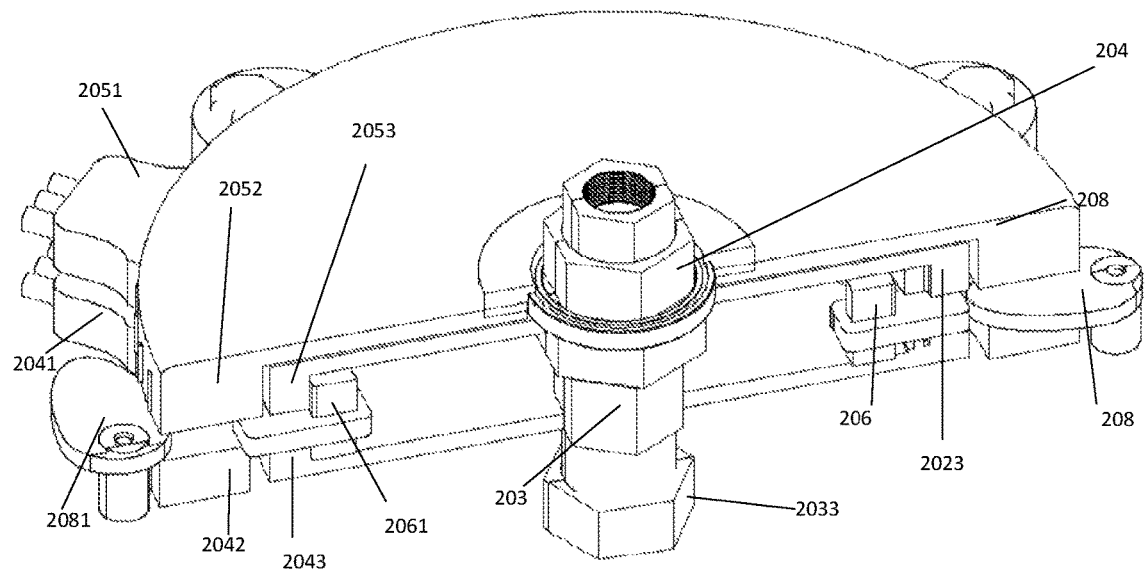
Figure 4.1

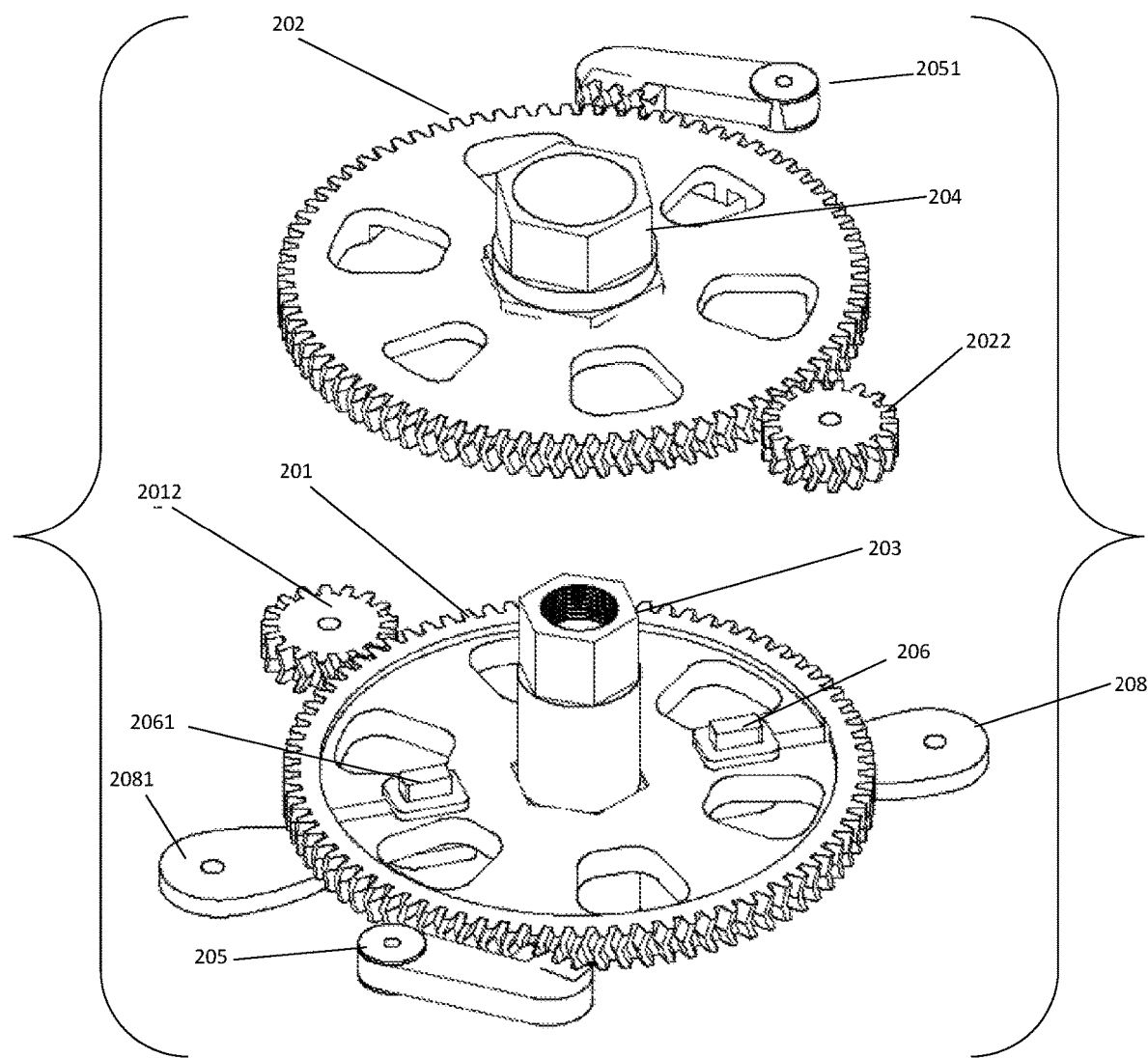
Figure 5
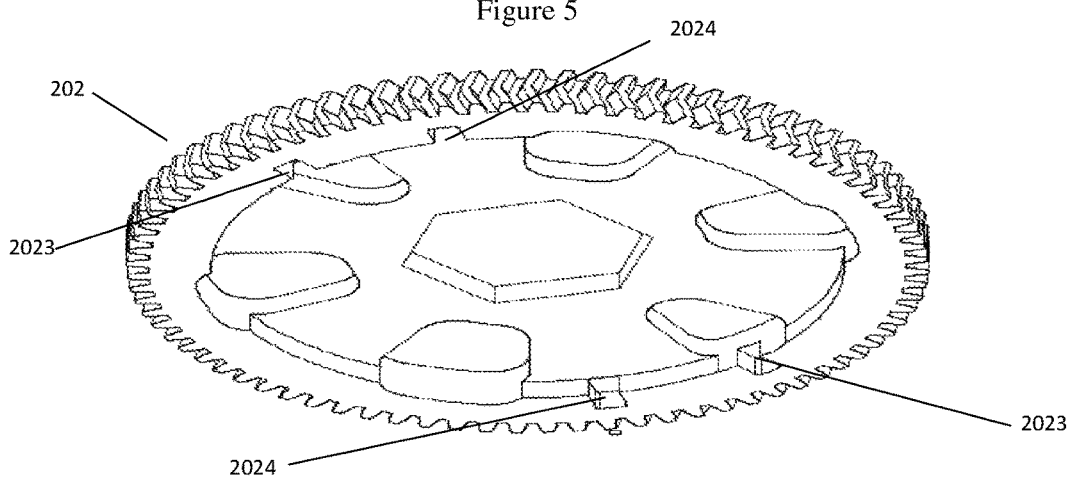
Figure 5.1

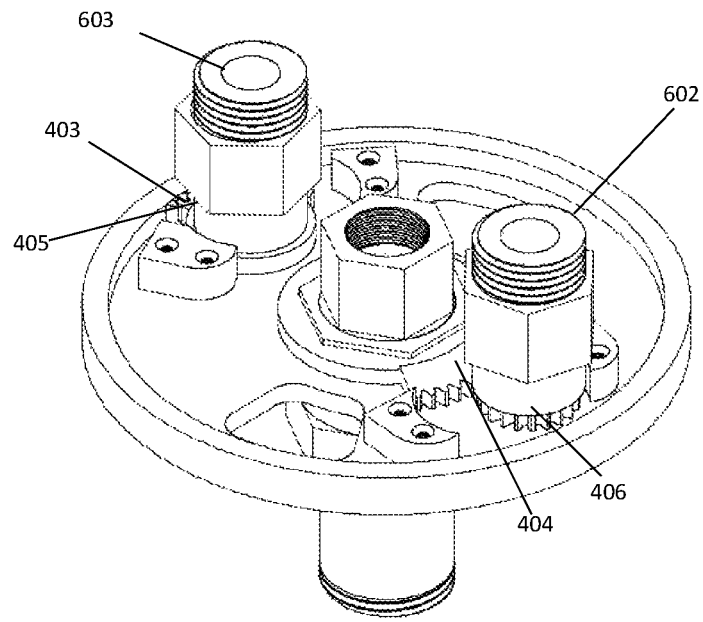
Figure 7.1
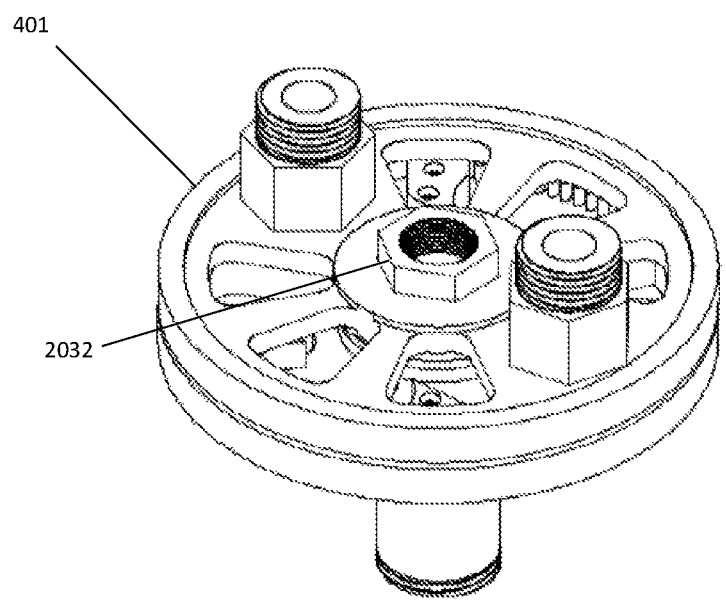
Figure 7.2

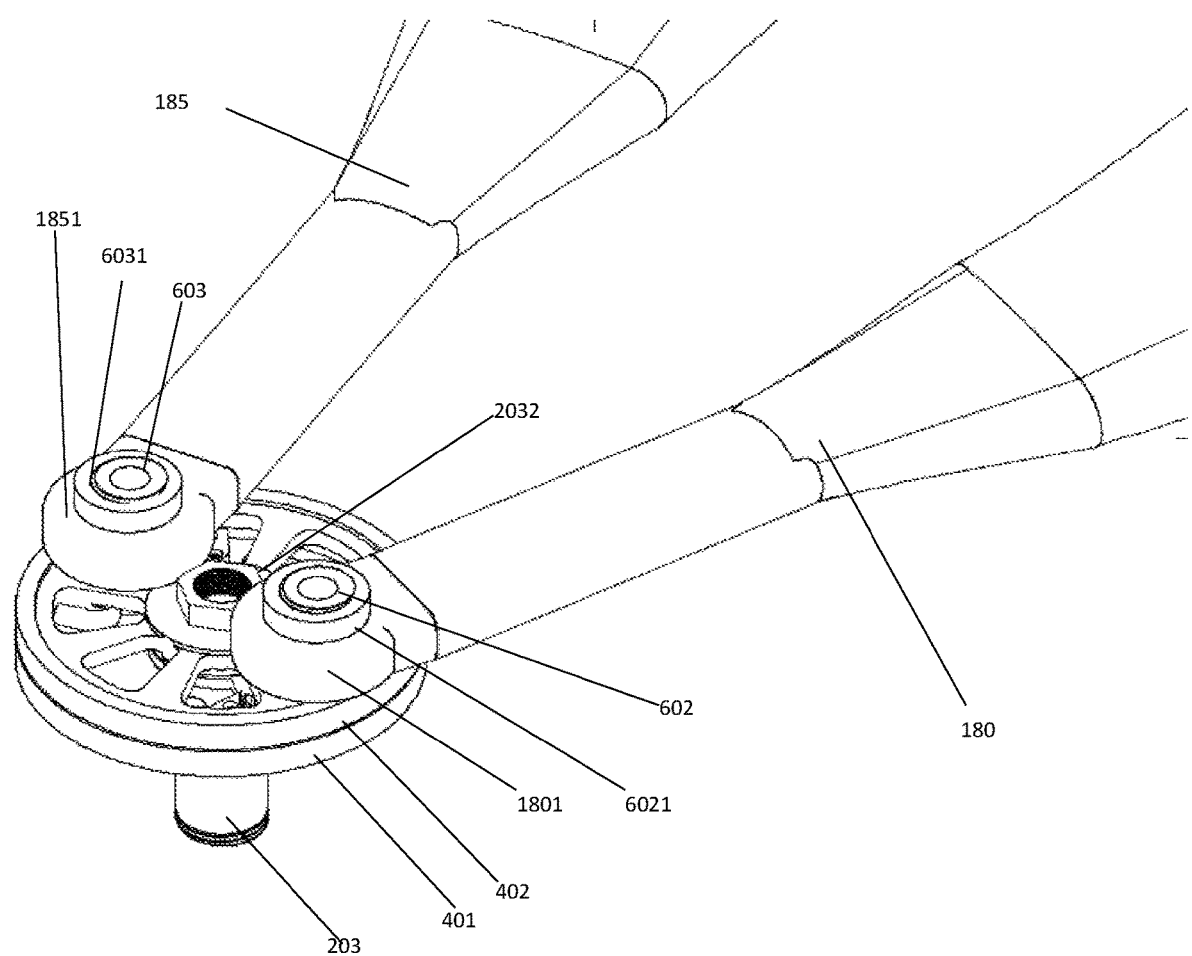
Figure 7.3

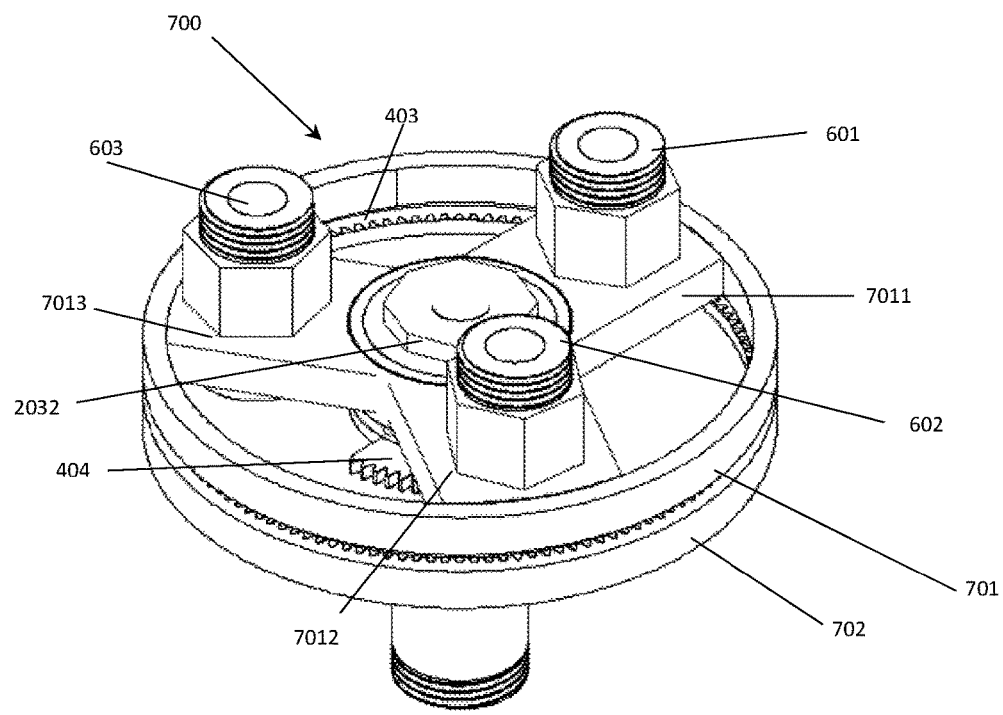
Figure 8
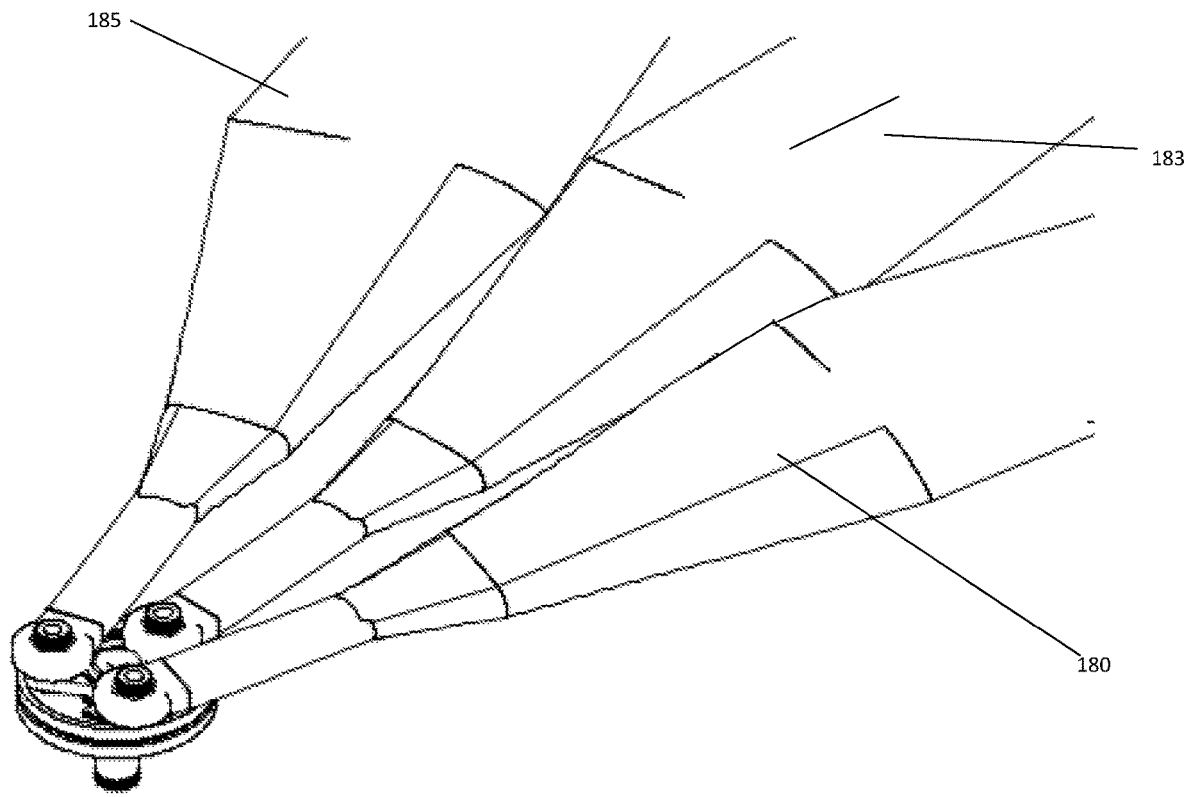
Figure 8.1

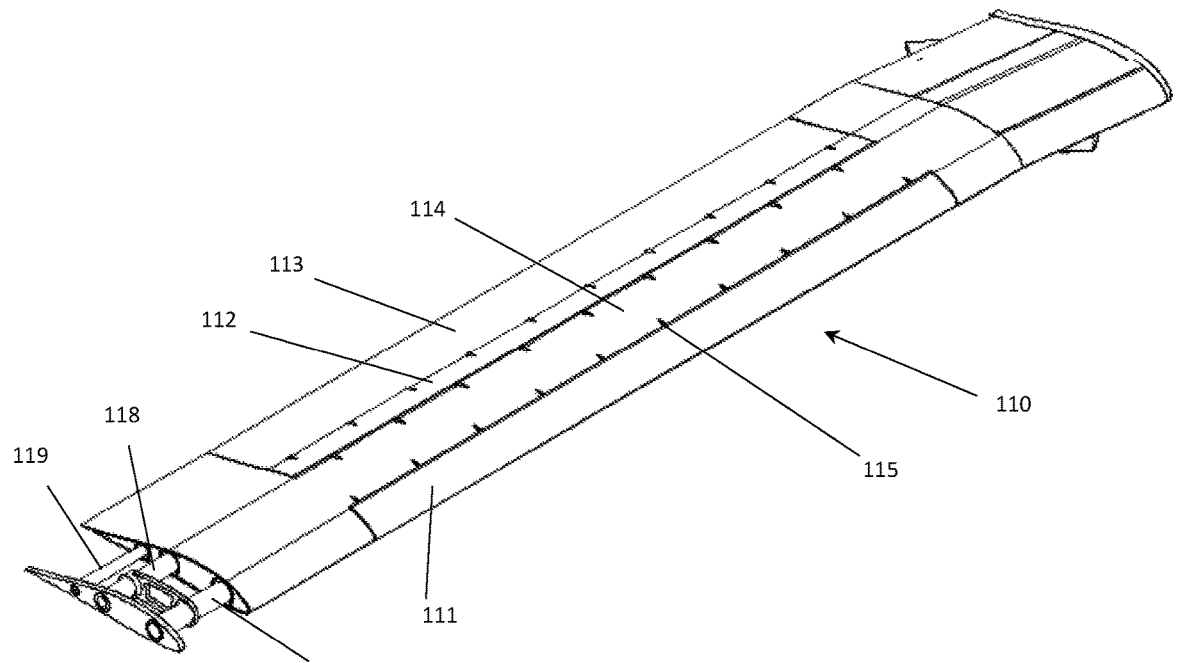
Figure 9
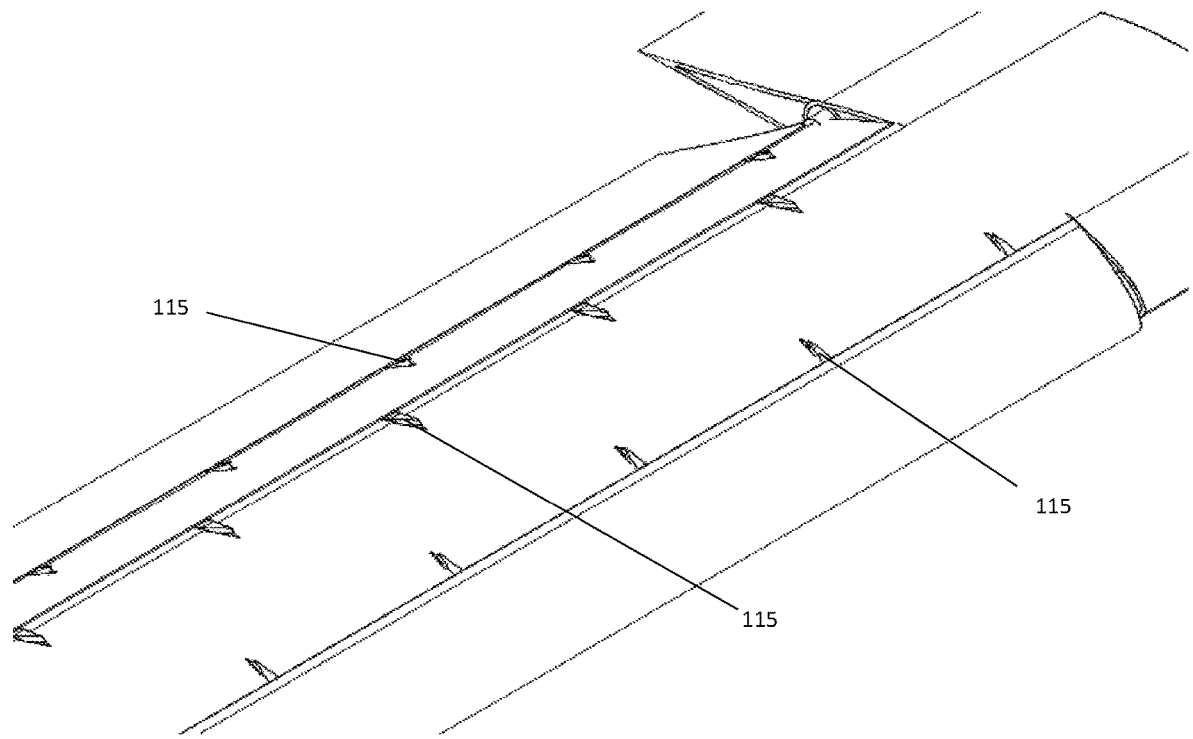
Figure 9.1

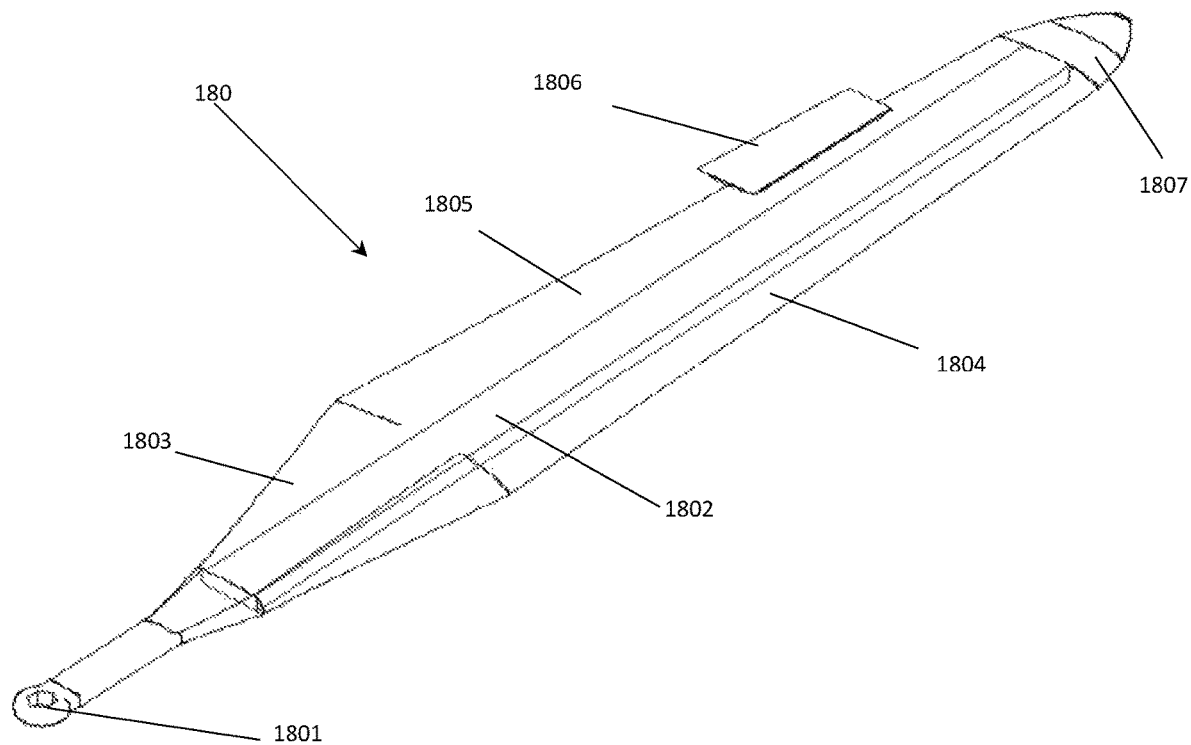
Figure 12
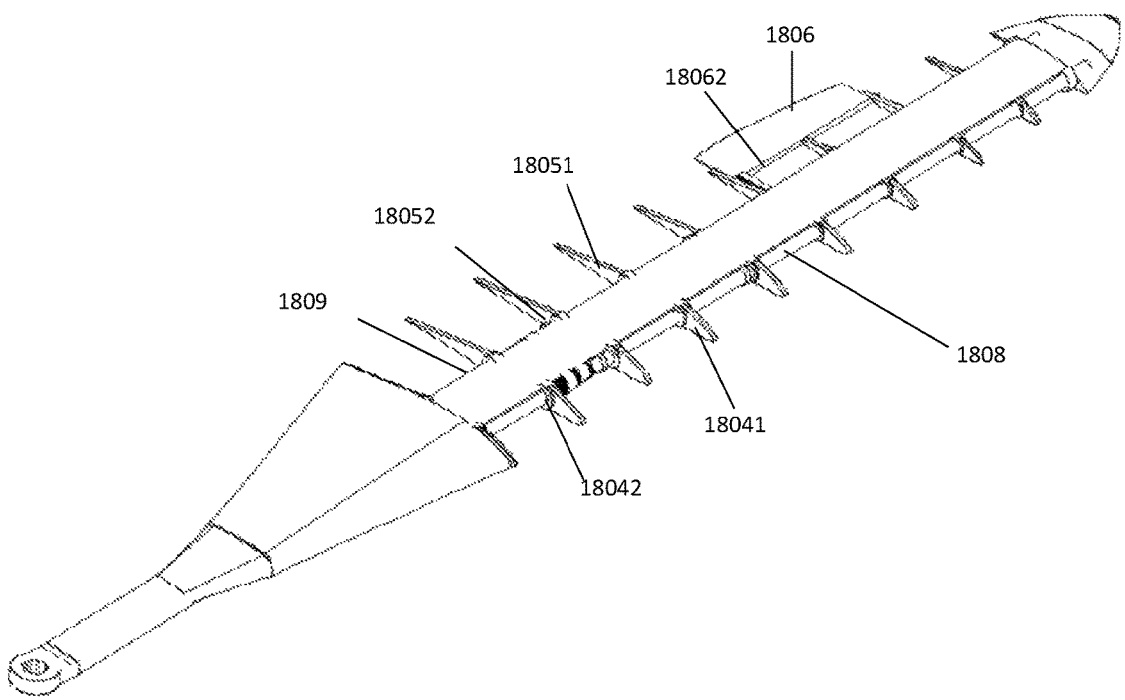
Figure 12.1

CONVERTIPLANE WITH STOPPED ROTORS, AND REPOSITIONABLE ROTOR BLADES

CROSS-REFERENCE TO RELATED APPLICATION

This application claims the benefit of Provisional Application No. 63/228,224, dated 2 Aug. 2021, by Gerald E. Brown.

STATEMENT REGARDING FEDERALLY SPONSORED RESEARCH OR DEVELOPMENT

NONE

BACKGROUND OF THE INVENTION

CPC CLASSIFICATIONS:

B64C 27/24
B64C 27/30
B64C 27/467
B64C 25/24
B64C 25/10
B64C 23/06
B64C 11/001
B64C 9/28
B64C 9/04
B64C 3/50
B64C 3/44

RELATED PATENTS:

| | | |
|---|---|---|
| U.S. Pat. No. 10,035,587 | Bevirt et al | July 2018 |
| U.S. Pat. No. 3,494,707 | Kisovec | December 1967 |
| U.S. Pat. No. 3,797,783 | Kisovec | May 1972 |
| U.S. Pat. No. 3,404,852 | Sambell et al | August 1966 |
| U.S. Pat. No. 8,376,264 | Hong | February 2013 |
| U.S. Pat. No. 3,149,800 | Fernandez | September 1964 |
| U.S. Pat. No. 11,052,996 | Garcia Nieto et al | July 2021 |
| U.S. Pat. No. 11,027,828 | Stefes | June 2021 |
| U.S. Pat. No. 10,889,370 | Bushmire | June 2021 |
| U.S. Pat. No. 10,882,606 | Bertoldi et al | January 2021 |
| U.S. Pat. No. 10,843,794 | Vetter et al | May 2019 |
| U.S. Pat. No. 10,752,340 | Rosenberger et al | August 2020 |
| U.S. Pat. No. 11,235,858 | Schank et al | February 2022 |
| U.S. Pat. No. 10,661,461 | Hayashi et al | April 2020 |
| U.S. Pat. No. 10,730,611 | Utt | 8/202 |
| U.S. Pat. No. 11,208,203 | Parks et al | December 2021 |
| U.S. Pat. No. 11,059,575 | Horn et al | August 2021 |
| U.S. Pat. No. 10,994,829 | Duffy et al | May 2021 |
| U.S. Pat. No. 10,960,975 | Villa | March 2021 |
| U.S. Pat. No. 10,849,599 | Popiks | January 2021 |
| U.S. Pat. No. 10,875,643 | Bevirt et al | December 2020 |
| U.S. Pat. No. 10,752,352 | Brand et al | August 2020 |
| U.S. Pat. No. 10,414,492 | Robertson et al | September 2019 |
| U.S. Pat. No. 10,293,928 | Vetter et al | May 2019 |
| U.S. Pat. No. 10,144,499 | Shepshelovich et al | December 2018 |
| U.S. Pat. No. 9,193,451 | Salyer | November 2015 |
| U.S. Pat. No. 8,070,090 | Tayman | December 2011 |
| U.S. Pat. No. 7,918,415 | de la Cierva Hoces | April 2011 |
| U.S. Pat. No. 8,757,537 | Walliser | June 2014 |
| U.S. Pat. No. 7,665,688 | Cylinder et al | February 2010 |
| U.S. Pat. No. 7,510,139 | Walliser | March 2009 |
| U.S. Pat. No. 7,014,142 | Barocela et al | March 2006 |
| U.S. Pat. No. 6,789,764 | Bass et al | September 2004 |
| U.S. Pat. No. 7,334,755 | Svoboda, Jr. | February 2008 |
| U.S. Pat. No. 4,979,698 | Lederman | December 1990 |

RELATED FOREIGN PATENTS:

| | | |
|---|---|---|
| RU 2706294C1 | Durov | November 2019 |
| RU 2699513C1 | Durov | September 2019 |

The field of this invention includes convertiplanes that conduct vertical flight operations in the manner of a helicopter and conduct horizontal cruise flight operations in the manner of a fixed wing aircraft. Aircraft designers and builders have worked for over a century to develop an aircraft that can take off vertically, transition to efficient cruise flight for an extended period of time, transition back to vertical flight mode, and land vertically with no need for a runway. Many vertical take-off and landing (VTOL) aircraft exist, but none possess efficient long range cruise capability. Many efficient long range cruise aircraft exist, but none possess VTOL capability. The factors of aeronautical design that permit efficient vertical flight, such as large rotors, counter-torque mechanisms, and robust gearboxes, are exceedingly inefficient in horizontal cruise flight. A successful cruise-efficient VTOL aircraft must not only provide efficient vertical lift for VTOL operations, but must then remove those aerodynamic elements that are advantageous for vertical lift but inhibit efficient flight in horizontal cruise. This is the challenge aircraft designers have faced for over a century. This invention meets that challenge by eliminating or reducing the aerodynamic elements that enable vertical lift but inhibit efficient cruise.

DESCRIPTION OF RELATED ART

In general, the reason vertical takeoff aircraft are inefficient in horizontal flight is that the mechanisms that provide efficient vertical lift, such as large rotors, are grossly inefficient for horizontal cruise. This is the problem aircraft designers have faced since the invention of the aircraft—how does one improve the efficiency of large rotors when in cruise mode? Prior art related to convertiplanes attempts to solve this problem using one of four methods. The first three methods eliminate large rotors entirely which simplifies the problem of what to do with them in cruise flight; however, since small diameter rotors are much less efficient than large diameter rotors, their vertical flight efficiency is greatly reduced at the start. The fourth method retains larger diameter rotors and attempts to solve the problems associated with their inefficiencies in cruise.

The first method employs smaller diameter propulsors such as propellers or ducted-fans, in a dual role wherein each propulsor provides the thrust for both vertical flight and horizontal cruise. The propulsors are oriented vertically to provide thrust for vertical takeoff and then rotate to a horizontal position to provide thrust for cruise. This is done by either tilting the propulsor itself or by mounting the propulsor to a wing and tilting the wing. For the tilt-wing designs, the mechanism needed to tilt the wings and propulsors must be robust which increases the weight and complexity of the vehicle. In some cases, the entire aircraft is oriented vertically for takeoff, i.e., a tail-sitter, and after takeoff the entire aircraft reorients to a horizontal flight position. A major disadvantage of this first method is that the propulsors cannot be optimized for vertical thrust without sacrificing efficiency in cruise thrust, and vice-versa. Consequently, the design of the propulsor is usually a compromise between the two. Additionally, since the power required for vertical takeoff is approximately six times greater than that required for cruise, aircraft using this first method are generally overpowered for cruise flight.

The second method utilizes separate vertical lift and horizontal cruise propulsors, wherein one set of propulsors provides all the vertical thrust, and a separate set of propulsors provides all the cruise thrust. Various designs have the vertical thrust propulsors embedded in the wings, or mounted on pylons or pods, or attached to the fuselage in some manner. The cruise propulsors are oriented in a fixed horizontal position. When the aircraft takes off vertically, the cruise motors are normally shut down. On transition to cruise mode, the cruise propulsors are powered up, and when sufficient cruise speed is reached, the vertical propulsors are shut down and streamlined in some fashion. The major disadvantage to this method is that during vertical flight the cruise propulsors are excess weight and drag, and during cruise flight the vertical propulsors are excess weight and drag.

The third method combines elements of the first two, utilizing some tilting propulsors and some fixed propulsors.

The fourth method takes advantage of the efficiency of large rotors, and stops them in flight to rely on wings for lift. The excess drag of the stopped rotors is reduced in a number of ways. One design folds the wings back in flight, such as described by the Bell Aerospace "Trailing Rotor Convertiplane", U.S. Pat. No. 3,404,852. Another design uses the blades in some manner for lift during cruise, such as the Kisovec/Boeing "Convertiplane" U.S. Pat. No. 3,494,707 wherein one blade is stopped in a wingtip position, and the other is put in a trail position. Another Kisovec Design, U.S. Pat. No. 3,797,783, converts one rotor blade to a wingtip and stores the other under the wing. Other designs retract the rotors into the body of the aircraft or into a pod, as in the S. Fernandez "Flying Machine and apparatus thereof" U.S. Pat. No. 3,149,800. These prior art designs and other similar ones decrease the drag of the blades to some degree, but in many cases the drag of the rotor pylons remains, and in all cases the added weight of the folding mechanisms, the gearboxes, and drivetrains, reduces the amount of payload otherwise available to the operator.

All four methods suffer from inefficient cruise flight due to the same major disadvantage; the vertical lift systems penalize cruise efficiency because in cruise mode they are not needed, they are excess weight, and they create excess drag. This greatly reduces the cruise performance and the cruise efficiency of aircraft using these methods.

The successful design would keep the benefit of a large rotor but then use the larger rotor blades in some manner that they become beneficial, efficient cruise flight elements. This invention takes this approach.

At least four prior art designs also take this approach: JOBY Aviation's VTOL aircraft described in U.S. Pat. No. 10,035,587; Jianhui Hong's Rotor for a Dual Mode Aircraft described in U.S. Pat. No. 8,376,264; Dmitry Sergeevich Durov's High Speed Jet Aircraft-Helicopter, described in Russian Patent 2706294C1; and Durov's Unmanned Jet Helicopter described in Russian Patent 2699513C1.

The Joby Aviation aircraft is equipped with fixed wings, with vertical thrust rotors mounted on each wingtip. It has a single propulsor affixed to and coplanar with the horizontal stabilizer. All three propulsors are powered by electric motors. Power is supplied by batteries alone which greatly reduces the aircraft's endurance. The horizontal stabilizer can tilt from vertical to horizontal orientations. For vertical flight the horizontal stabilizer is oriented in a vertical position. All three electric propulsors produce vertical thrust. All three propulsors employ fixed-pitch blades, so vertical thrust is changed by varying the speed (RPM) of the motors. After vertical takeoff, the horizontal stabilizer is tilted forward and the tail propulsor provides horizontal thrust. On reaching sufficient cruise speed, the vertical lift wingtip rotors are stopped, the retreating rotor blade is moved to a forward-facing position such that the rotor blades become extended wingtips. In addition to moving the retreating blade into a forward-facing position, the mechanism partly embeds the blade root into the wing to minimize drag while still increasing the overall wing area. The blades have no capability to increase pitch or change blade angle, so they cannot provide any roll control or any other additional benefit during cruise.

The Jianhui Hong Dual Mode Aircraft is also equipped with fixed wings and wingtip mounted rotors. It uses large turbine engines coupled to the wing mounted rotors via a gearbox and drive shafts. For cruise flight the rotors are stopped, and the retreating blades are rotated to a forward-facing position to reduce drag and provide additional lift during cruise. The blades are vertically separated and can be individually moved to any desired azimuth. Pitch control of the blades provides roll capability in cruise. A second embodiment of this design is that of an intermeshing rotor helicopter with a canard and a tail mounted wing. Again, jet turbines power the rotors via a gearbox, and the same jet turbines provide cruise thrust. After vertical takeoff and upon reaching sufficient forward speed, the counterrotating rotor blades are stopped and the retreating blades are moved to a forward-facing position in an "X-wing" configuration. This reduces blade drag, but the high drag of the rotor masts remains and greatly reduces cruise efficiency. In addition, both embodiments lose efficiency through the heavy gear boxes and drive shafts.

The Durov Jet Aircraft-Helicopter employs wingtip mounted rotor blades that can be stopped and reconfigured to a forward-facing wingtip position. This reduces drag and provides additional lift during cruise, but there is no additional roll control. The rotors are mechanically driven via a gearbox and driveshaft from fuselage mounted jet turbines, which like the Jianhui Hong Dual Mode Aircraft, greatly reduces available payload and reduces overall efficiency.

The Durov Unmanned Jet Helicopter has a swept main wing with coaxial two bladed rotors mounted above the center of gravity of the aircraft. It also employs a small enclosed horizontal fan in the tail for pitch control. Aircraft is powered by two jet-turbines with power transferred to the coaxial rotors and the tail fan via a gearbox and drive shafts. The rotors operate as a normal coaxial helicopter for vertical takeoff. For cruise flight the rotors are stopped in an X-wing configuration. The forward blades are moved backward toward a position just forward of the lateral axis, and the retreating blades of the same blade pair are repositioned to a forward-facing position just aft of lateral resulting in both top and bottom blades now in a V wing position on either side of the center rotor pylon. But like the Durov and Jianhui designs above, this aircraft design also suffers from greatly reduced cruise efficiency due to the higher drag of the rotor pylon, and the reduced payload caused by the heavy gearbox and drive This invention demonstrates considerable improvements over the above prior art designs. This aircraft uses electric motors of high power to weight ratio for all propulsors, therefore no gearboxes or drive trains are needed. It uses larger diameter rotor blades that change camber rather than blade angle to vary thrust thus eliminating collective and cyclic control mechanisms. It repositions the large rotor blades from a rotor-wing configuration to a fixed-wing configuration to enable them to operate as ailerons and become useful, beneficial cruise elements as explained hereinafter in the detailed description. This aircraft also uses a hybrid power system wherein electric power is provided by an engine driven generator, by batteries, and by supercapacitors thus providing much longer range and endurance than batteries alone can provide.

This invention introduces a new term—"Rotoron". Traditionally, in aeronautics when a single flight surface performs two distinct functions, the names are combined. For example, a combined flap and aileron mechanism is known as a flaperon, and a combined elevator and aileron is known as an elevon. In this invention the rotor blade functions as both a traditional rotor blade and a traditional aileron, so hereinafter the rotor blade will be referred to as a "rotoron." The term "rotor blade" will continue to be used as needed when it provides greater clarification such as when describing a traditionally understood configuration; e.g., "helicopter rotor blade configuration", or when referring specifically to the rotor blade as a component unrelated to its function.

BRIEF SUMMARY OF THE INVENTION

This invention is an aircraft which can take off vertically in rotor-wing mode like a helicopter, transition to efficient cruise flight in fixed-wing mode like an airplane, transition back to rotor-wing mode, and land vertically like a helicopter. All configuration changes, flight control commands, and other maneuvering instructions are issued by a flight control computer.

An important objective of this invention is to create a VTOL aircraft that operates efficiently in cruise mode. A second objective is to create a VTOL aircraft that exhibits a significantly reduced acoustics signature relative to other VTOL aircraft. Quiet VTOL operations are absolutely necessary if this aircraft is to be accepted by the community within areas, especially urban areas, in which it will be capable of operating.

The key to the efficiency of this invention is the Rotor Control Assembly which effectively repositions the Rotorons from a rotor-wing configuration wherein the blades are separated azimuthally by 180° in a two-blade configuration or 120° in a three blade configuration, to a fixed-wing configuration where the blades are extended from the wingtip with approximately a 30° angular separation as a "V-wing" to function as ailerons. To conduct VTOL operations the wingtip mounted Rotorons, in rotor-wing mode, produce the majority of the vertical thrust, and the vertically oriented tail mounted propulsors produce the remainder of the vertical thrust. In the preferred embodiment the tail mounted propulsors are ducted-fans. After vertical takeoff, the aircraft transitions to fixed-wing cruise in the following manner: the ducted-fans increase power slightly to raise the tail which pitches the aircraft nose down and increases forward velocity as the ducted-fans continue to tilt down toward the horizontal position. When the aircraft reaches an airspeed slightly above stall speed (the airspeed at which the wings support the weight of the aircraft), the Rotorons are stopped and repositioned to the "V" wing configuration. The ducted-fans have been tilted full forward to a horizontal position producing all the forward thrust for cruise flight. The aircraft is now in fixed-wing cruise mode. To revert back to vertical flight for landing, the aircraft slows down to just above stall speed, the Rotorons are repositioned to rotor-wing configuration and powered up, and the ducted-fans are tilted back to the vertically oriented position.

The aircraft hybrid power system generates, stores, and distributes electrical energy to the propulsors, the flight control systems, vehicle status systems, the communications and navigation systems, and all other vehicle systems.

The wings, Rotorons, and specified flight control surfaces employ a camber changing mechanism to vary the lift that each of these elements produces.

The aircraft can be fitted with either monoplane wings (MonoWings) or end-connected biplane wings (Joined-Wings).

The Rotor Control Assemblies can be fitted with either two-bladed or three-bladed rotors to satisfy different operator objectives.

The aircraft can also be fitted in one or more embodiments with different landing gear such as fixed gear, retractable gear, or skids. The preferred landing gear comprises four independently articulating legs to keep the fuselage level when landing on uneven or sloped landing areas.

BRIEF DESCRIPTION OF THE DRAWINGS

FIG. 3 illustrates a side view looking outward from the wingtip of the Rotor Control Assembly with the Gear Cover cutaway and with the Concentric Axle Blade Positioner.

FIG. 3.1 is a side view looking outward from the wingtip of the Rotor Control Assembly with the Gear Cover cutaway and with the dual axle Rack & Pinion Positioner.

FIG. 4 is a side view of the Rotor Control Assembly Power Section, showing the can-style Drive and Guide Electric Motors, the Motor Gears, the Drive and Guide Gears, the Drive and Guide Gear Shafts, a cutaway of the Gear Cover, and the Wingtip Base.

FIG. 4.1 is a top isometric view of the Rotor Control Assembly Power Section with pancake style motors, the rotors of which are connected directly to the Drive and Guide Shafts.

FIG. 5 is an exploded parts view of the Power Section displaying the upper Guide Gear, the lower Drive Gear, the hollow Drive Shaft, the hollow coaxially mounted Guide Shaft, the Drive Gear and Guide Gear Latches, the Coupler Locks, the Coupler Lock Actuator Cams, and the Drive Motor Gears. In this view the Guide Gear, Guide Gear Latch, and Guide Gear Motor Gear are raised above their operating positions to reveal the Coupler Lock Actuator Cams and the Coupler Locks in the decoupled position.

FIG. 5.1 shows the underside of the Guide Gear indicating the locations of the Rotor Detent and Cruise Detent into which the Coupler Locks engage to lock the Drive and Guide Gears together during rotor-wing VTOL operations and during fixed-wing cruise operations respectively.

FIG. 7.1 repeats FIG. 7 and illustrates the Forward and Aft Blade Axles rigidly affixed to the Forward and Aft Pinions respectively.

FIG. 7.2 repeats FIG. 7.1 and illustrates the addition of the Drive Plate and the Restraining Nut.

FIG. 7.3 repeats FIG. 7.2 illustrating the addition of the Rotoron Blades rigidly affixed via the Blade Axle Adapters to the Blade Axles, with Blade Axle Caps rigidly affixed to the Blade Axles.

FIG. 8 is a top isometric view of the Three Blade Drive Plate mounted on the Drive Shaft with the Restraining Nut fastened. The Center, Forward, and Aft Rotoron Blade Axles are shown inserted into their respective mounting holes in the Drive Plate. The Center Blade Axle is rigidly fixed to the Three Blade Drive Plate, while the Forward and Aft Blade Axles are rotatably inserted. The Three Blade Drive Plate is fixed to the Drive Shaft, and the Three Blade Guide Plate is fixed to the Guide Shaft rotatably mounted coaxially with the Drive Shaft.

FIG. 8.1 illustrates the Rotoron Blades rigidly mounted to the Blade Axles shown in FIG. 8.

FIG. 9 is an isometric view of the left wing looking from the fuselage toward the left wingtip showing the cylindrical tubes in this embodiment, which comprise the Fore Spar, the Aft Spar, and the Trailing-Edge Flap Spar. The Center Wing section is rigidly mounted to the Fore and Aft spars. The Leading-Edge Flap, the First-Flap, and the Trailing-Edge flap are rotatably mounted to the Fore, Aft, and Trailing-Edge Flap Spars and are shown in the retracted position. Integral Vortex Generators built into each Flap are visible.

FIG. 9.1 is a close-up view of a section of the wing in FIG. 9 with all Flaps slightly extended down showing the Vortex Generators extended upwards from their recessed positions.

FIG. 12 is an isometric view of a left Rotoron Blade from the blade root to the blade tip. The right Rotoron Blade is a physical and functional mirror image of the left Rotoron Blade.

FIG. 12.1 is an isometric view of a left Rotoron Blade with the Blade skins transparent to enable a view of the Blade Spar, the Leading-Edge Flap Ribs and Spar, and the Trailing-Edge Ribs and Spar.

DETAILED DESCRIPTION

Figure 1:
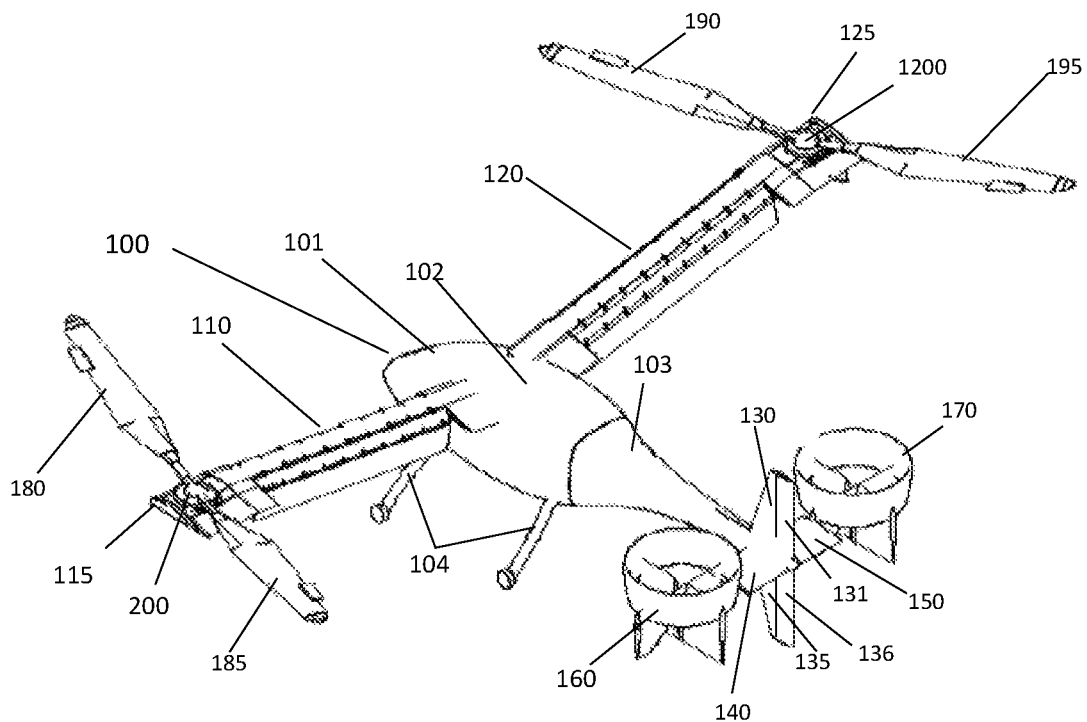
FIG. 1 is a left rear isometric view of a MonoWing embodiment of the aircraft with the wingtip mounted two-bladed Rotor Control Assemblies in rotor-wing VTOL configuration, with flaps full down, with tail mounted propulsors in a vertical thrust position and shown in the preferred ducted-fan configuration, and with landing gear extended and shown in the preferred configuration as articulating legs, according to one or more embodiments.

Referring to the drawings, FIG. 1 illustrates a Mono-wing aircraft comprising a fuselage 100, a left wing 110 and a left Wingtip 115, a right wing 120 and a right Wingtip 125. The Left and Right Wingtips, 115 and 125, in every illustration are physical and functional mirror images of each other. Each Wingtip houses a Rotor Control Assembly 200 and 1200 described in detail hereinafter. The Left and Right Rotor Control Assemblies are physical and functional mirror images of each other. The Wingtips also house electric drive motors, electronic motor controllers, and associated necessary wiring, connectors, and peripheral items of a type and in a manner familiar to those skilled in the art.

The aft area of the fuselage comprises a dorsal vertical stabilizer 130, and dorsal rudder 131, a ventral vertical stabilizer 135 and ventral rudder 136, a left horizontal stabilizer 140, a right horizontal stabilizer 150, a left tilting propulsor 160 mounted to the left horizontal stabilizer 140, and a right tilting propulsor 170 mounted to the right horizontal stabilizer 150. The aircraft is shown in the Mono-wing, two-blade Rotoron embodiment. For VTOL operations the left Rotorons 180 and 185, are separated by 180 degrees as are the right Rotorons 190 and 195. The tail propulsors 160, 170 are shown in the vertical thrust position. The tail propulsors 160, 170 may be of any type determined by the objectives of the operator but are shown in the preferred embodiment as ducted-fans to provide low acoustic signatures.

Fuselage: Referring to FIG. 1, the fuselage 100 further comprises a cockpit section 101, a payload section 102, a power generation section 103, and landing gear 104. The landing gear can be of one or more embodiments, and are shown in the preferred embodiment as individually articulating legs. The cockpit section contains accommodations for the flight crew, including all flight controls, aircraft status and attitude displays, navigational displays, communications equipment, flight control computers, and crew accommodations. In some embodiments the aircraft may be remotely piloted, in which case, the cockpit 101 will be configured to accommodate remote or autonomous control equipment and other equipment determined by the operator. In some embodiments the payload section 102 may be configured for passengers, cargo, or both. The power generation section 103 aft of the payload section in some embodiments may contain a hybrid power plant, electrical generators of various types, electric energy control and storage devices, and other equipment depending on the objectives of the operator.

The dorsal vertical stabilizer 130 and ventral vertical stabilizer 135 are of conventional symmetric airfoil design with rudders 131, 136 operating in a manner familiar to those skilled in the art, but these stabilizers may alternatively employ leading-edge flaps, trailing-edge flaps, and camber control elements that change the camber of the airfoil to increase lift in the desired direction.

The horizontal stabilizers 140, 150 are symmetric airfoils, each equipped with moveable leading-edge flaps, trailing-edge flaps, and camber control mechanisms that change the camber of the airfoil to increase lift in the desired direction.

The fuselage 100 also contains mechanisms such as cables, pushrods, servos, and other transducers familiar to those skilled in the art, which activate the flight control surfaces and which tilt each propulsor according to flight control commands, in one or more embodiments.

Figure 2:
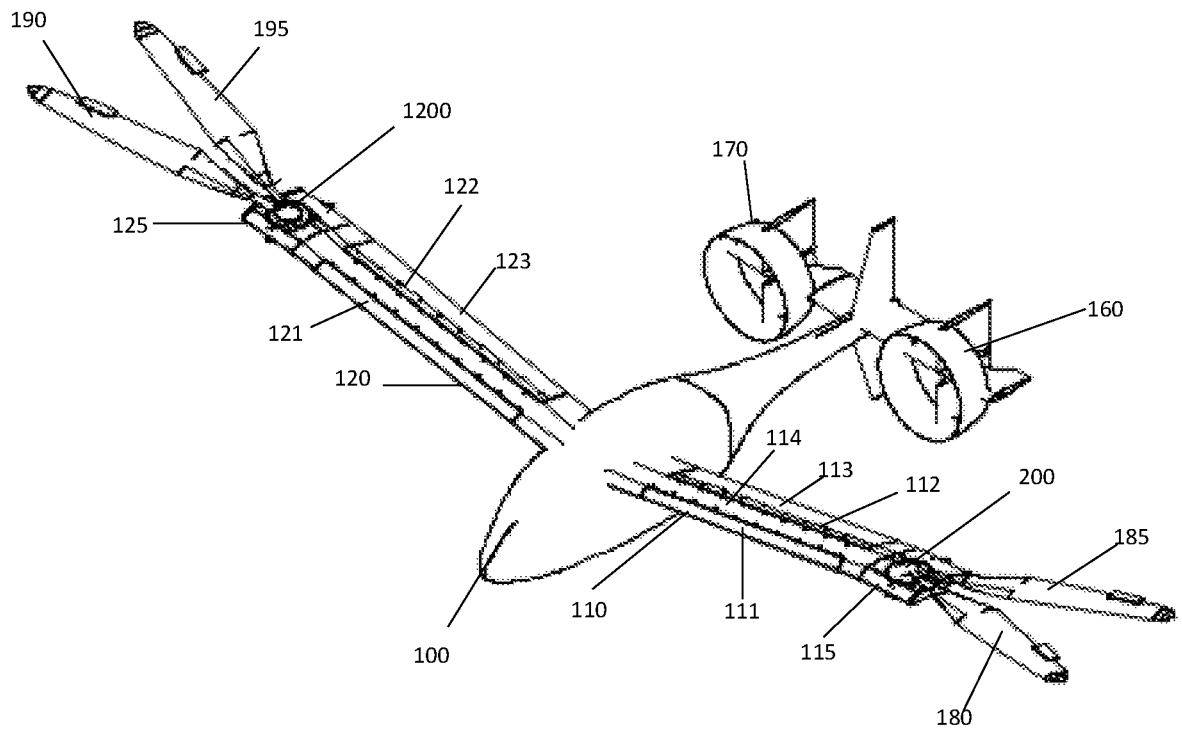
FIG. 2 is a left front isometric view of a MonoWing embodiment of the aircraft in fixed-wing cruise configuration. The Wingtip mounted rotorons are oriented as V-wing ailerons, the flaps are full up, the tail mounted ducted-fans are in a horizontal thrust position, and the landing gear is retracted, according to one or more embodiments.

FIG. 2 depicts the aircraft in the cruise configuration with the Rotorons 180, 185, and 190, 195 shown in the V configuration with approximately 30° angular separation for fixed-wing cruise operations. The left wing 110 comprises Leading Edge Flaps 111, First-Flaps 112, Trailing-Edge Flaps 113, and a Center Wing section 114 wherein camber change mechanisms and electric energy storage devices may be placed, in one or more embodiments. The right wing 120 is a physical and functional mirror image of the left wing, with the Leading-Edge Flap 121, First-Flap 122, and Trailing-Edge Flaps 123 operating in the same manner as their left wing complements. The left Rotor Control Assembly 200 is mounted in the left wingtip 115, and the right Rotor Control Assembly 1200 is mounted in the right wingtip 125.

Rotor Control Assembly: The Rotor Control Assembly is the key to this aircraft's efficiency in fixed-wing cruise flight. It represents a major improvement in performance over prior art in that it repositions the large blade rotors such that they become beneficial elements in cruise flight. References in the following figures and descriptions are to the Left Rotor Control Assembly. The Right Rotor Control Assembly is a physical and functional mirror image of the Left Rotor Control Assembly, and all descriptions and definitions apply equally to both. The Rotor Control Assembly comprises two major sections: 1) the Power Section, which powers the Assembly in rotor-wing mode and locks the blades in position; and 2) the Blade Positioner Section, which sets the angular relationship between the Rotoron blades. FIG. 3 illustrates the Rotor Control Assembly 200 with a geared, can-style electric motor Power Section, above which is the Concentric Axle Positioner 300 and attached Rotorons 180, 185. FIG. 3.1 illustrates the Rotor Control Assembly with the direct drive pancake-style motor Power Section, above which is the Rack & Pinion Positioner 400 and attached Rotorons 180, 185. The Power Section with gears is separated from the Blade Positioner Section by the Gear Cover 209, shown in cutaway.

Power Section: Each Power Section has the ability to drive any of the Blade Positioners. The Power Section illustrated in FIG. 4 comprises a Drive Gear 201 affixed to a hollow Drive Shaft 203 and positioned just below a Guide Gear 202 which is affixed to a hollow Guide Shaft 204 mounted coaxially on the Drive Shaft 203. A Latch 205 for the Drive Gear and a Latch 2051 (not visible) for the Guide Gear lock both Gears into a fixed position when the aircraft is in fixed-wing mode or when parked. Two Coupler Locks 206 and 2061 couple the Drive Gear and Guide Gear together to operate as a single unit when the aircraft is in rotor-wing mode or when the Rotoron Blades are stationary in fixed-wing mode. Each Coupler Lock is engaged by a Coupler Lock Cam 208, 2081, which are individually actuated by electric motors (not shown) affixed to the Wingtip Base 2091. Additional bearings and clip rings are not shown but locations and purposes are familiar to those skilled in the art. Mounted inside the hollow shaft of the Drive Gear 203, but not visible, is an electric slip ring of standard construction that transmits power and signals from the flight controller to the camber actuators mounted in the Rotorons 180, 185, described hereinafter. The Drive Shaft 203 is rotatably mounted to the Wingtip Base 2091 on its vertical axis in a bearing 2031 and held tight to the bearing by the Drive Shaft Locking Nut 2033. The Guide Shaft 204 is rotatably mounted coaxially to the Drive Shaft 203. The Gear Cover 209, shown in cutaway, is affixed to the Wingtip base 2091, mounts over and affords protection to the Drive and Guide Gears, and provides a second upper rotary bearing 2032 for the Drive Shaft 203. The Drive Shaft and the Guide Shaft both provide the motive connection between the Drive Motors and the Rotoron Blades using the Blade Positioner mechanism. To maintain a reliable, fail-safe condition, the Rotor Control Assembly is powered by two independent motors, the Drive Motor 2011, and the Guide Motor 2021. Each motor is capable of powering the entire assembly when coupled together during rotor-wing operations. The Drive Motor 2011 is connected to the Drive Gear 201 by the Motor Gear 2012, and the Guide Motor 2021 is connected to the Guide Gear 202 by the Motor Gear 2022. Each Motor operates independently according to the signals sent by the flight controller.

FIG. 4.1 illustrates the pancake-style Power Section showing the motive power provided by two pancake style motors, the Drive Motor 2041, and the Guide Motor 2051. The Drive Motor 2041 comprises the Drive Stator 2042, and the Drive Rotor 2043 which is rigidly affixed to the Drive Shaft 203. The Guide Motor 2051 comprises the Guide Stator 2052 and the Guide Rotor 2053 which is rigidly affixed to the Guide Shaft. For illustrative purposes, FIG. 4.1 shows the Coupler Lock Cam 2081 rotated outward away from the Coupler Lock 206, which allows it to engage in the Detents, described hereinafter, and couple the Drive Rotor and Guide Rotor together. Similarly, on the opposite side, FIG. 4.1 depicts Coupler Lock Cam 208 rotated into and moving Coupler Lock 206 out from the Detents, thus decoupling the Drive Rotor and Guide Rotor, and allowing the Rotorons to turn independently and move from fixed-wing to rotor-wing and vice versa.

FIG. 5 depicts an exploded view of the Gearing mechanism of the Geared Power Section showing the Guide Gear 202, Guide Shaft 204, Guide Gear Latch 2051, and the Guide Motor Gear 2022 in their relative positions but elevated above their operating position. The Drive Gear 201, Drive Shaft 203, Drive Gear Latch 205, Drive Motor Gear 2012, Coupler Locks 206, 2061, and Coupler Lock Cams 208, 2081 are shown in their relative operating positions.

FIG. 5.1 illustrates the Cruise Detents 2023 and Rotor Detents 2024 machined in the Guide Gear 202 or the Guide Stator into which the Coupler Locks engage to lock the Drive and Guide Gears and Drive and Guide Stators together during Fixed-Wing cruise and Rotor-wing VTOL flight respectively.

Blade Positioner Section: The Rotor Control Assembly can accommodate multiple Blade Positioner configurations. The choice of Positioner depends on the objectives of the operator. The Blade Positioner configurations are defined by the type of mechanism used to position the blades relative to each other, and by the number of blades. Three are described here: the two-blade Concentric Axle Positioner; the two-blade Rack & Pinion Positioner; and the three-blade Rack & Pinion Positioner, each of which is described in detail hereinafter.

Figure 6:
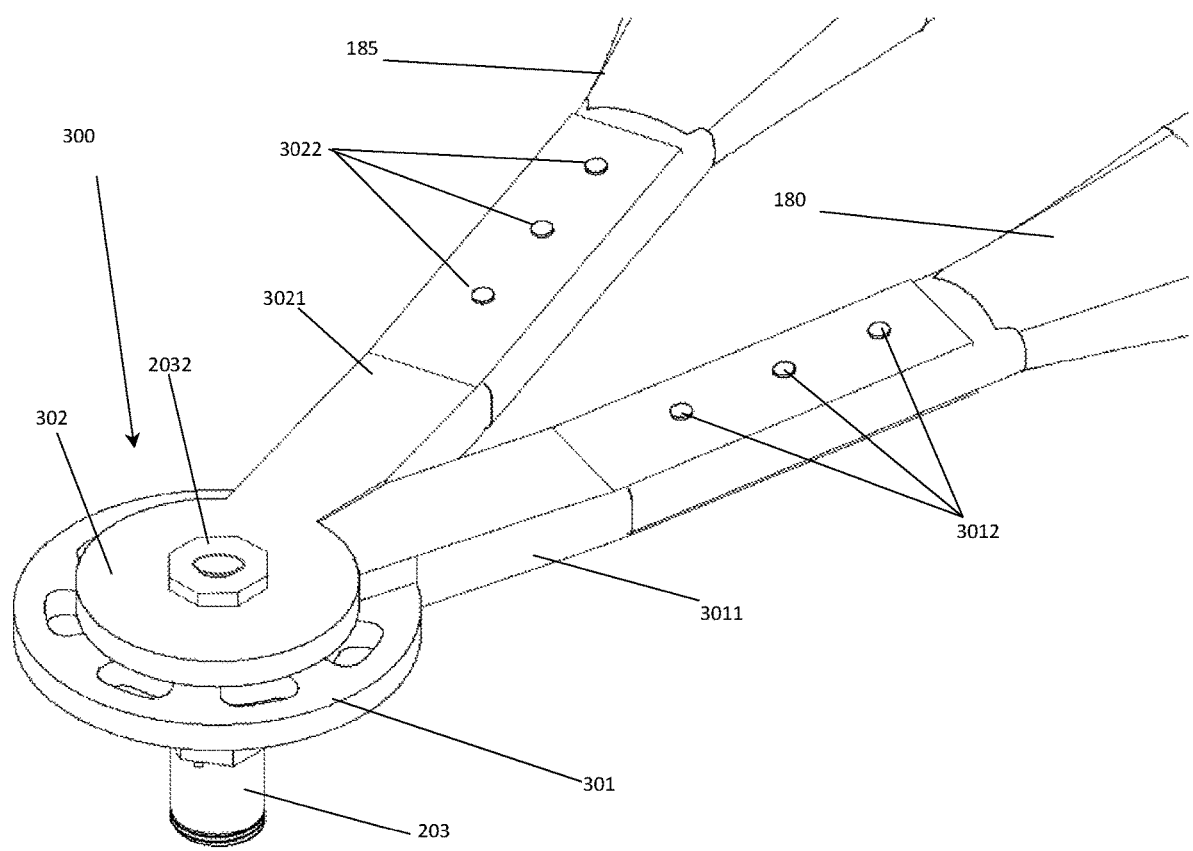
FIG. 6 is an isometric view of the Concentric Axles Blade Positioner in a two-blade configuration. Shown are the Aft Rotoron Disk affixed to the Drive Shaft, the Forward Rotoron Disk affixed to the Guide Shaft (which is not visible), the Restraining Nut, and the Rotoron Blades bolted directly to the extended arms of the Rotoron Disks.

Concentric Axle Positioner 300: Reference FIG. 6, the two-blade Concentric Axle Positioner 300 comprises an Aft Concentric Disk 302 axially and rigidly affixed at its center to the Drive Shaft 203, and a Forward Concentric Disk 301 axially and rigidly affixed to the Guide Shaft 204 (not visible) The Guide Shaft 204 is rotatably mounted onto the Drive Shaft 203 permitting the Forward Concentric Disk 301 to rotate about the Drive Shaft 203. A Restraining Nut 2032 is rigidly affixed to the top of the Drive Shaft 203 to hold the Disks in place. The aft Rotoron Blade 185 is rigidly affixed via bolts 3022 to the extended arm 3021 of the Aft Concentric Disk 302. The forward Rotoron Blade 180 is rigidly affixed via bolts 3012 to the extended arm 3011 of the Forward Concentric Disk 301.

To reposition the Rotorons from the fixed-wing configuration to the rotor-wing configuration, the Coupler Lock Cams 208, 2081 engage to move the Coupler Locks 206, 2061 out of the Cruise detent, decoupling the Drive and Guide Gears 201,202. The Drive Motor 2011 remains held in position, the Drive Gear Latch 205 remains engaged to hold the Drive Gear 202 stationary as the Forward Motor 2021 is activated, and the Guide Gear 201 begins to rotate. The Forward Concentric Disk 301, rotating with the Guide Gear, moves the affixed forward Rotoron Blade 180 toward the nose of the aircraft and 180° angular separation from the aft Rotoron 185, while the Aft Concentric Disk 302 and aft Rotoron Blade 185 remain held in position by the stationary Drive Motor 2011, Drive Gear 201, and Drive Gear Latch 205. When the Forward Rotoron 180 is separated by 180° azimuth, the spring-loaded Coupler Locks 206, 2061 are forced into the Rotor Detents 2024 shown in FIG. 5.1, the Drive Gear Latch 205 is unlatched, the Drive Motor 2011 is activated, and the Drive Gear 201, Guide Gear 202, and Rotorons 180,185 are now locked into the rotor-wing configuration. The Rotor Control Assembly is now configured for VTOL operations.

Figure 7:
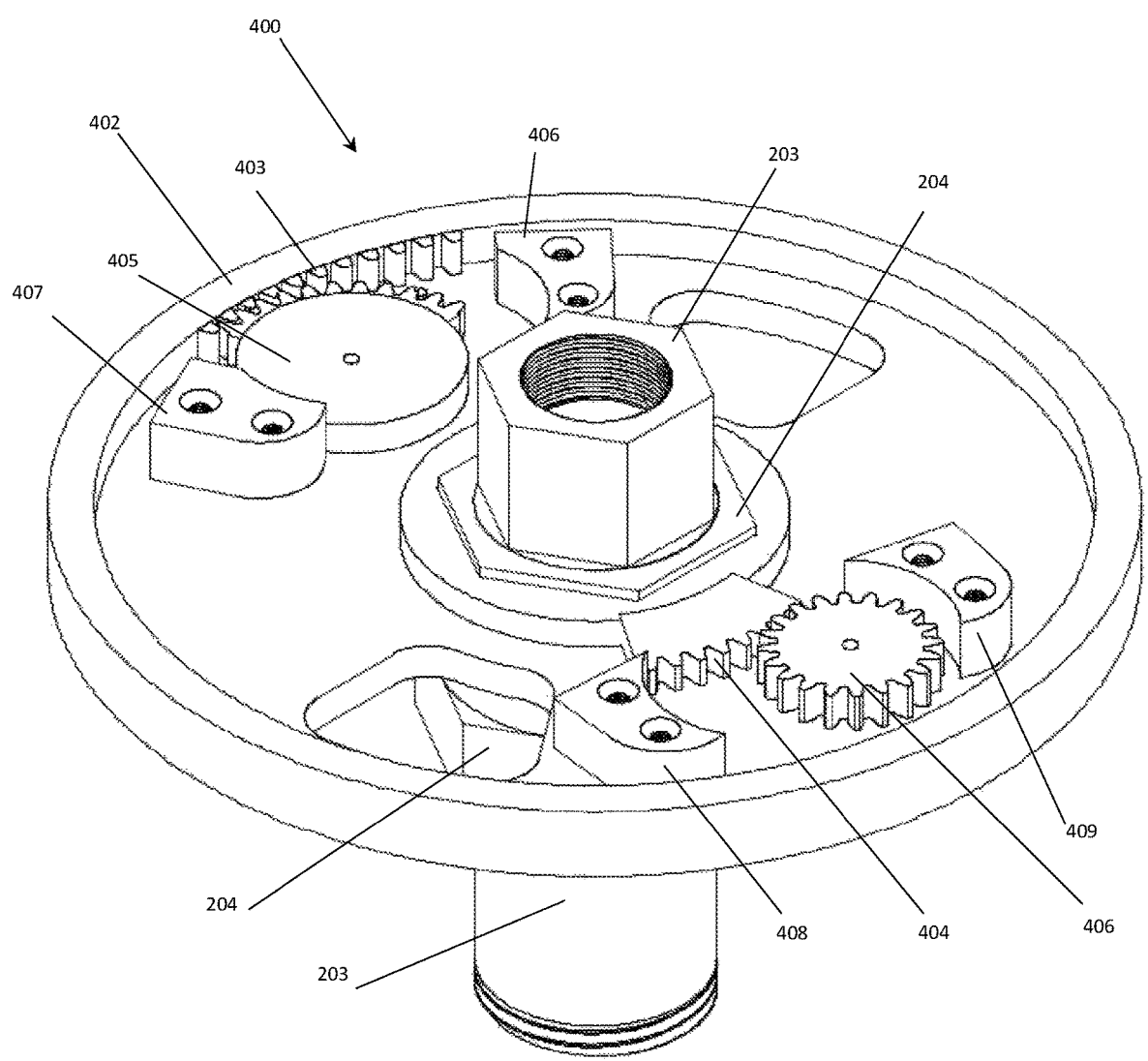
FIG. 7 is a top isometric view of the Guide Plate for the Rack & Pinion Positioner. The Guide Shaft is affixed to the Guide Plate, and the Drive Shaft is inserted coaxially into the Guide Shaft. The Forward and Aft Pinions are shown meshed into the Arcuate Racks, and the Blade Axle Stops are shown.

Two Blade Rack & Pinion Positioner 400: FIG. 7 illustrates the Rack & Pinion Positioner comprising a Guide Plate 402, an Aft Arcuate Rack 403, and a Forward Arcuate Rack 404 machined into the Guide Plate 402 as shown. The Rotoron Positioners are the Aft Pinion 405 and the Forward Pinion 406. The teeth of the Aft Pinion 405 mesh with the teeth of the Aft Arcuate Rack 403, while the teeth of the Forward Pinion 406 mesh with the teeth of the Forward Arcuate Rack 404. Aft Blade Axle Stops 406, and 407, and Forward Blade Axle Stops 408 and 409 stop the movement of the Blade Axles at the appropriate locations. FIG. 7.1 illustrates the Aft Rotoron Blade Axle 603 rigidly affixed to the Aft Pinion 405 which is meshed into Aft Arcuate Rack 403, and the Forward Rotoron Blade Axle 602 rigidly affixed to the Forward Pinion 406 which is meshed into the Forward Arcuate Rack 404. FIG. 7.2 replicates FIG. 7.1 with the addition of the Drive Plate 401 and the Restraining Nut 2032. FIG. 7.3 replicates FIG. 7.2 and additionally shows the Rotoron Blades 180, 185, the Rotoron Blade Adapters, 1801, 1851, the Blade Axle Caps 6021 and 6031, and the Restraining Nut 2032.

The Rack & Pinion Positioner changes the Rotorons from the fixed-wing configuration to the rotor-wing configuration by engaging the Coupler Lock Cams to move the Coupler Locks out of the Cruise detents, decoupling the Drive and Guide Gears which can now move independently. The Drive Gear Latch releases the Drive Gear, but the Guide Gear Latch holds the Guide Gear stationary as the Drive Gear begins to rotate. The Drive Plate rotates with the Drive Gear, moving the Pinions through the stationary Arcuate Racks and causing them and the affixed Blade Axles to rotate within the Drive Plate mounting holes, and the affixed Rotorons to rotate accordingly. The Aft Rotoron 185 rotates toward the tail of the aircraft, and the Forward Rotoron 180 rotates toward the nose of the aircraft. As the Rotorons reach the specified angular separation for that rotor configuration, 180-degrees for the two-blade configuration or 120-degrees for the three-blade configuration, the spring-loaded Coupler Locks are forced into the Rotor Detents shown in FIG. 4.1. At this point the Guide Gear Latch is released, the Guide Gear Motor is activated in synch with the Drive Gear Motor, and the Drive Gear, the Guide Gear, and Rotorons are now locked into and operating in the rotor-wing configuration.

To return to the fixed-wing cruise configuration from the rotor-wing configuration, the Rotor RPM is slowed and stopped at the azimuth point where the Coupler Lock Cams can drive the Coupler Locks to decouple the Drive and Guide Gears. The Drive Gear Motor stops and holds the Drive Gear and Drive Plate stationary. The Drive Gear Latch is engaged to hold the Drive Gear stationary as the Guide Gear and Guide Plate continue to rotate. The relative movement of the Rack & Pinions is now effectively reversed. As the Guide Plate continues to move, the Arcuate Racks are now moving across the Pinions causing the Pinions to rotate in the opposite direction and return the Rotorons back to the "V", or fixed-wing configuration. As that position is reached, the spring-loaded Coupler Locks are forced back into the Cruise detents shown in FIG. 4.1, the Guide Gear Motor stops, the Guide Gear Latch is re-engaged, and the Rotor Control Assembly is again locked into the fixed-wing cruise configuration.

FIG. 8 illustrates the Three Blade Rack and Pinion Positioner 700, showing the configuration of the Three Blade Drive Plate to accommodate three Rotoron Blades. Blade Axle 601 is rigidly affixed to the center spoke 7011 of Drive Plate 701, Blade Axle 602 is rotatably mounted into the mounting hole of forward spoke 7012, and Blade Axle 603 is also rotatably mounted in the mounting hole of aft spoke 7013. The Arcuate Racks 403 and 404 are machined into the Guide Plate in a matching azimuthal position with Blade Axles 602 and 603. FIG. 8.1 replicates FIG. 8 additionally showing the Rotoron Blades 183, 180, and 185 rigidly affixed to the Blade Axles 601, 602, and 602 respectively.

The operational sequence of actions to reconfigure from rotor-wing to fixed-wing and back with the Three-Blade Rack & Pinion Positioner is the same as described above for the Two-Blade Rack & Pinion Positioner.

Wings: FIG. 9 depicts the left wing 110. The right wing is a physical and functional mirror image of the left wing. The wings comprise a Fore Spar 117, an Aft Spar 118, a Trailing-Edge Flap Spar 119, a fixed Center Wing section 114, a rotatable Leading-Edge Flap 111, a rotatable First-Flap section 112, and a rotatable Trailing-Edge Flap section 113. Wing camber is changed by changing the relative angles of these rotatable flap sections. The flaps are interconnected by flexible connectors and are moved in unison by the Wing Camber Control Mechanism. FIG. 9.1 shows the Flaps slightly extended, and illustrates the extended Vortex Generators which are integrated into each of the Flap Sections as shown.

Figure 10:
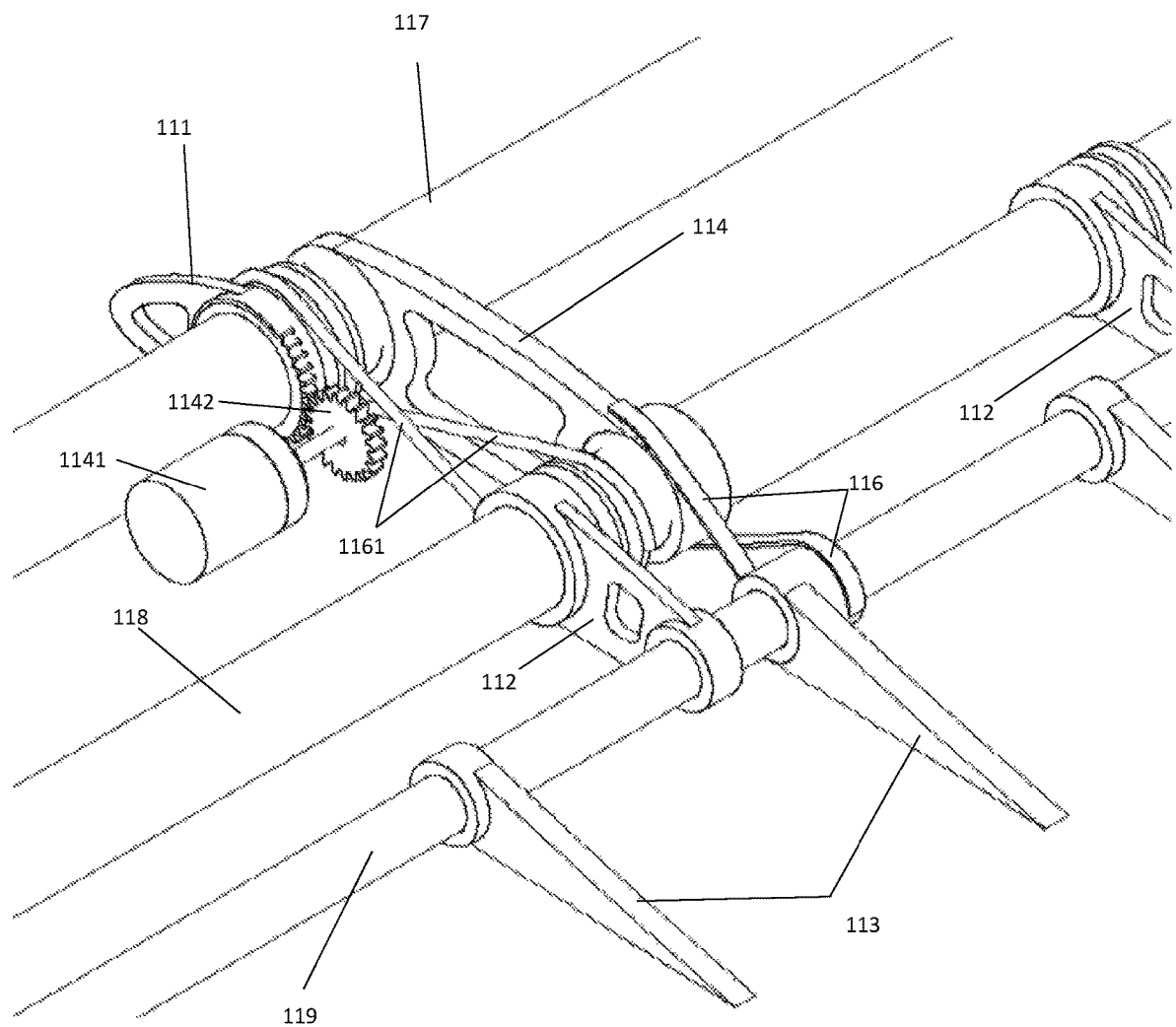
FIG. 10 is an isometric view of one embodiment of the wing camber control mechanism showing an electric motor actuator with gears meshed to a Leading-Edge Flap Rib. The Leading-Edge Flap Ribs are affixed to the Leading-Edge Flap Skin forming the Leading-Edge Flap which rotates about the Fore Spar. Flexible connectors, hereinafter referred to as belts, cross-connect a Leading-Edge Flap Rib to a First-Flap Rib. Belts are shown connecting a Trailing-edge Flap Rib to a Center wing Rib. First-Flap Ribs are affixed to the First Flap Skin and rotate about the Aft Spar as the First-Flap. Trailing-edge flap Ribs, the Trailing-edge flap Spar, and the Trailing-edge flap Skin comprise the Trailing-Edge Flap.
Figure 11:
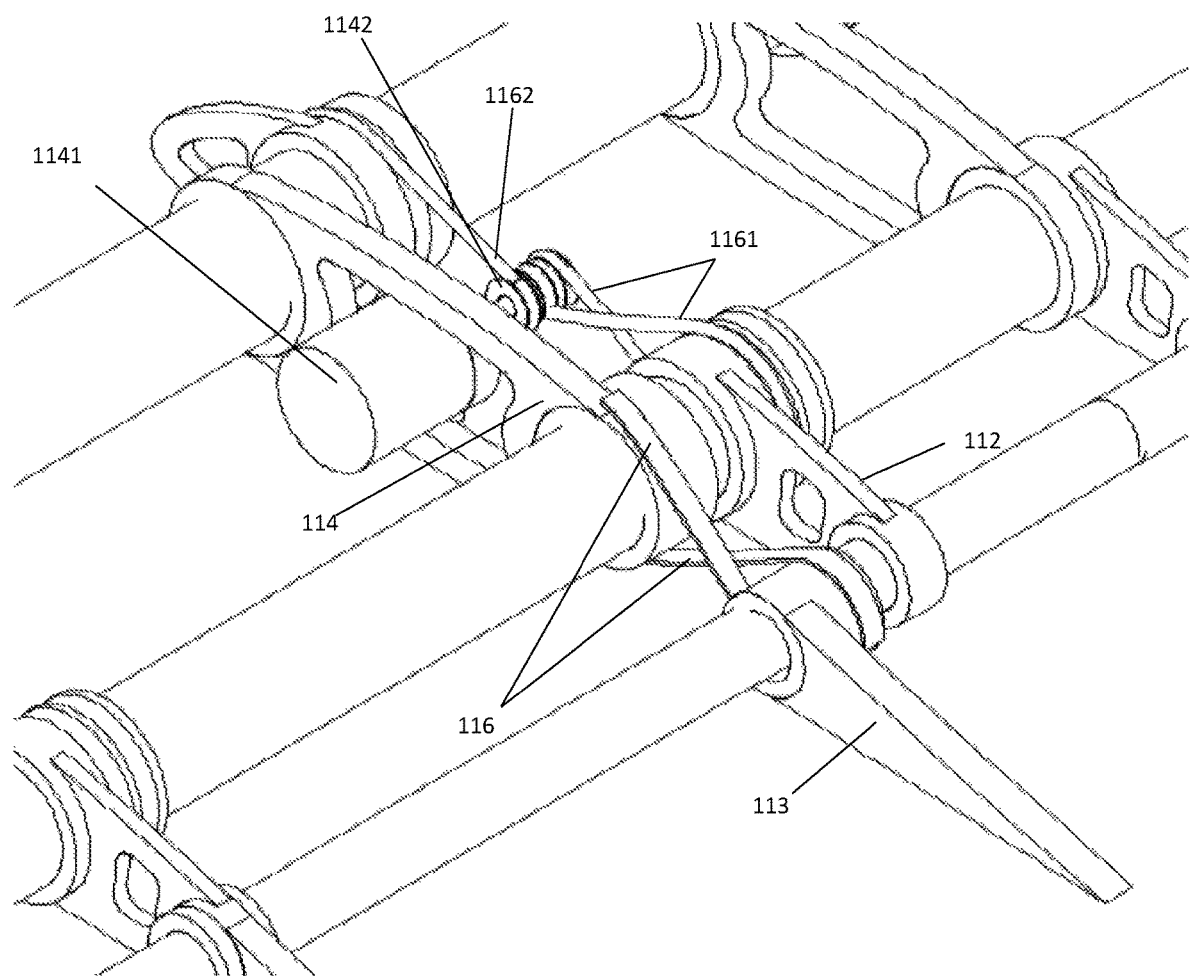
FIG. 11 is an isometric view of one embodiment of the wing camber control mechanism employing an electric actuator with pulleys and belts connecting the Leading-Edge Flap Rib to a First-Flap Rib. Belts also connect a Trailing-edge flap Rib to a Center wing Rib.

Wing Camber Control Mechanism: FIG. 10 depicts the Wing Camber Control mechanism. This Wing Camber Control Mechanism does not rely on any adaptive wing technologies such as morphing, morphing materials, or piezoelectric actuators. The wing, spars, flaps, and ribs can be constructed with traditional aircraft materials well known to those familiar with the art. Camber control servos and actuators can be of existing brands and types well known to those familiar with the art. To allow a view of the wing ribs, the Fore and Aft Spars and the control apparatus, the Center Wing and Flap skins are not shown. The Center wing section remains fixed during all camber changes. The Leading-Edge Flap 111, the First-Flap 112, and Trailing-Edge Flaps 113 are rigidly fixed to their respective ribs, so the references to the ribs in FIGS. 10 and 11 will be considered references to the Flaps. The Leading-Edge Flap Ribs 111, First-Flap Ribs 112, and Trailing-Edge Flap Ribs 113 are mechanically connected via a flexible connecting element that does not stretch, hereinafter referred to as a Belt. The Leading-Edge Flap 111 is rotatably mounted onto the Fore Spar 117. The First-Flap 112 is rotatably mounted onto the Aft Spar 118. The Trailing-Edge Flap 113 is rigidly affixed to the Trailing-Edge Flap spar 119. The Trailing-Edge Flap Spar 119 is rotatably mounted through the aft holes in the First-Flap Ribs 112. One or more Trailing-Edge Flap Ribs 113 is connected to one or more Center Wing Ribs 114 by a Trailing Edge Belt 116. The entire camber-changing mechanism can be driven by one or more actuators of one or more types depending on the objectives of the user and the specific size of the aircraft in one or more embodiments. A single actuator can be used for smaller airfoils, although two or more would provide a more reliable fail-safe condition. Two potential embodiments are shown. The first embodiment, shown in FIG. 10, depicts an electric motor actuator 1141 connected via gears 1142 to a Leading-Edge Rib 111. As the motor gear turns (clockwise in this view), the Leading-Edge Flap rotates counterclockwise downward toward the front. A Leading-Edge Rib is cross-connected via Leading Edge Belts 1161 to a First-Flap Rib 112 which is caused to rotate the entire First-Flap in the clockwise direction downward toward the rear. The Trailing-Edge Flap Ribs 113 are rigidly fixed to the Trailing-Edge Flap Spar 119. One or more Trailing-Edge Flap Ribs are also connected via Trailing Edge Belts 116 from the bottom of a Trailing-Edge Flap Rib 119 to the top of a Center-Wing Rib 114, and one or more are similarly connected from the top of a Trailing-Edge Flap Rib 119 to the bottom of a Center-Wing Rib 114. As the First-Flap 112 rotates downward, the Trailing-Edge Spar rotates with it. The Trailing Edge Belts 116 between the Trailing-Edge Flap Rib 113 and the stationary Center-Wing Rib 114 cause the Trailing-Edge Flap to rotate downward in the same direction as the First-Flap but at a slightly faster rate. The resulting movements of the Flaps change the camber of the Wing.

The second embodiment of the Wing Camber Control Mechanism is depicted in FIG. and 11 shows an alternative actuating element. In this embodiment instead of using a geared element, the electric motor actuator 1141 is connected to a Leading-Edge Flap Rib 111 via a Pulley Set 1142 and Belt 1162. It is also cross-connected to a First-Flap 112 Rib via the Pulley Set 1142 and Belts 1161. The electric actuator turns both flaps simultaneously in counter directions (downward), and the Trailing Edge Flap 113 rotates in the same manner as described above, resulting in increased camber of the Wing. In both embodiments, the rates at which the flaps rotate, and the resulting relative angles can vary individually based on the ratios of the radii of the Flap Ribs to which the Belts are attached.

FIG. 12 illustrates the features of a left Rotoron Blade 180. All left Rotoron Blades 180, 183, 185 are exact duplicates. The right Rotoron Blades are physical and functional mirror images of the left Rotoron Blades, and all descriptions apply equally to left and right blades. The Rotoron Blade comprises the Main Blade Spar 1802, the Leading-Edge Flap 1804 which is rotatably hinged to the forward edge of the Blade Spar, the Trailing Flap 1805 which is rotatably hinged to the aft edge of the Blade Spar 1802, the Trim Flap 1806, the Rotor Tip Fairing 1807, the Blade Fairing 1803, and the Blade Axle Adapter 1801 which is only utilized to connect the Rotoron Blade to the Blade Axle of the Two-Blade and Three-Blade Rack & Pinion Positioners. The Blade Axle Adapter 1801 is not used with the Concentric Axle Positioner. The Blade Spar 1802 is the primary structural element. FIG. 12.1 illustrates additional components of the Rotoron Blade visible when the Blade Spar, Leading-Edge Flap, and Trailing Flap are transparent;

the Blade Spar 1802, the Leading-Edge Hinge Points 18042, the Leading-Edge Spar 1808, The Trailing Edge Spar 1809, Leading-Edge Flap Ribs 18041, the Trailing-Flap Ribs 18051, Trailing Flap Hinge Points 18052, Trim-Flap Ribs 18061, and the Trim-Flap Spar 18062

Figure 13:
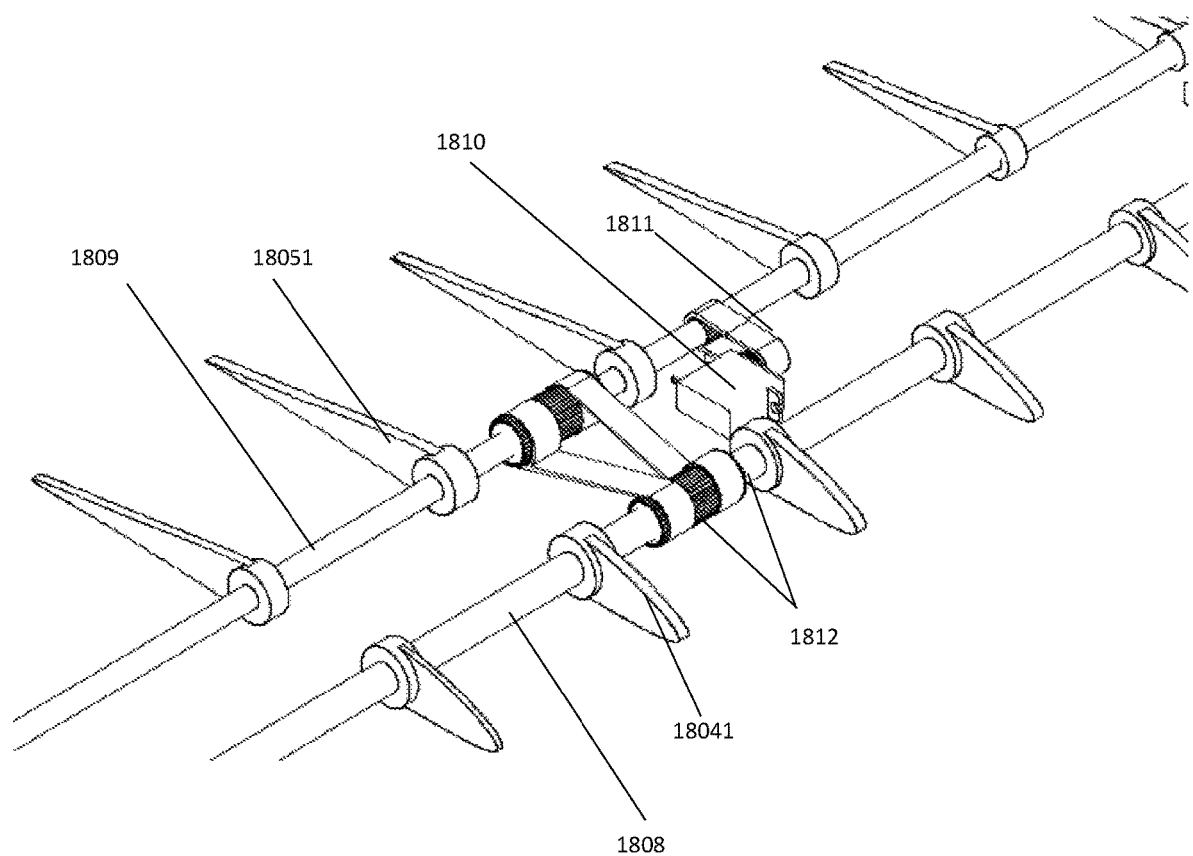
FIG. 13 is an isometric view of a section of the internal structure of the Rotoron, viewed from the blade root toward the tip, showing the Rotoron camber changing mechanism. The Leading-Edge Spar and the Trailing-Edge Spar are cross-connected via Belts. An electric actuator, a servo in this embodiment, is Belt-connected to the Trailing-Edge Spar. When the actuator moves the Trailing-Edge Flap downward, the cross-connected belts also move the Leading-Edge Flap downward.
Figure 14:
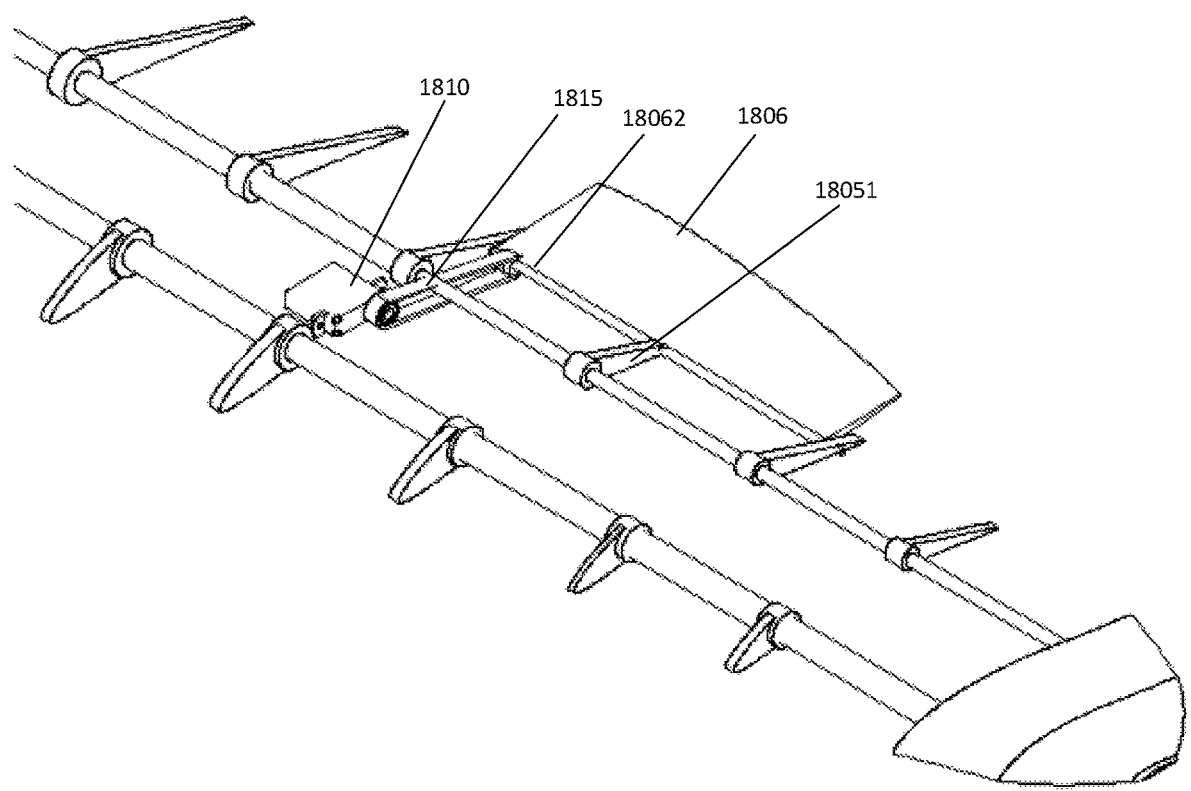
FIG. 14 is a front isometric view of the internal structure of the Rotoron, viewed from the blade tip toward the blade root, illustrating the Trim-Flap method of controlling camber. In this embodiment the Trim-Flap is shown rotatably mounted to shortened Trailing-Edge Flap Ribs via a small spar. The Trim-Flap Spar is shown connected via belt to the Trim-Flap Actuator mounted inside the Rotoron Blade Spar (transparent in this view).

Rotoron Camber Control Mechanism: FIG. 13 illustrates the parts and components of the Rotoron which control the camber of the Rotoron Blade. The Leading-Edge Flap Ribs 18041 are rigidly connected to the Leading-Edge Spar 1808 which is rotatably hinged at the hinge points 18042 to the forward edge of the Blade Spar. Similarly, the Trailing-Edge Flap Ribs are rigidly connected to the Trailing-Edge Spar which is rotatably hinged at the hinge points 18052 of the aft edge of the Blade Spar 1802. The Leading-Edge Spar 1808 is connected to the Trailing Edge Spar 1808 via cross-connected Spar Belts 1812. The Camber Actuator 1810, shown as a typical servo in this embodiment, is rigidly mounted inside the hollow section of the Blade Spar 1802, and connected via the Actuator Belt 1811 to the Trailing-Edge Spar 1809. When the flight controller commands the Actuator to rotates the Trailing-Edge Spar, and consequently the Trailing Edge Flap, the cross-connected Spar Belts 1812 rotate the Leading-Edge Flap in the counter direction thus increasing the camber of the Rotoron Blade and the lift it produces.

A second method of moving the Trailing-edge Flap is illustrated in FIG. 13.1 In this embodiment the Trailing-Edge Flap 1805 is modified to accommodate a Trim-Flap 1806. The Trim-Flap 1806 is rigidly affixed to the Trim-Flap Spar 18062 which is rotatably hinged to shortened Trailing-Edge Flap Ribs 18051. The Camber Actuator 1810 is affixed inside the Blade Spar and connected to the Trim-Flap Spar 18062 via the Trim-Flap Belt 1815. A command from the flight controller rotates the Camber Actuator 1810 causing the belt-connected Trim-Flap 1806 to also rotate. As the Trim-Flap rotates, for example, upward, airflow over the Rotoron Blade surface forces it back down to a streamlined position. The hinge-connected Trailing-Edge Flap is also forced downward and rotates about its hinge connected to the Center Spar. As the Trailing-Edge Flap rotates down, the cross-connected Leading-Edge Flap is forced to rotate in the counter direction, which is also downward, thus increasing the camber of the Rotoron Blade and increasing the lift it produces.

Figure 15:
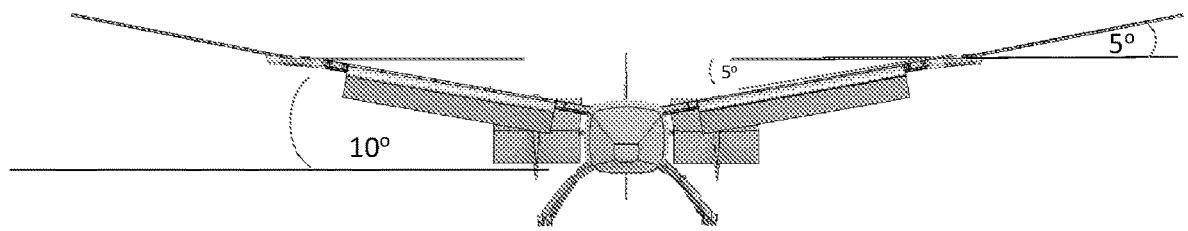
FIG. 15 is a front view of a MonoWing embodiment of the aircraft in VTOL configuration showing the wings at 10° dihedral relative to the horizontal plane, the Wingtips at 5° dihedral relative to the horizontal plane, and the Wingtip mounted two-bladed Rotorons at 5° dihedral to the plane of the Wingtip. The 5° Rotoron dihedral will vector the airflow slightly away from the fuselage to reduce the downwash turbulence directly beneath the aircraft. The flaps are shown full down, the tail mounted propulsors are in a vertical thrust position, and the landing gear is extended, according to one or more embodiments.
Figure 16:
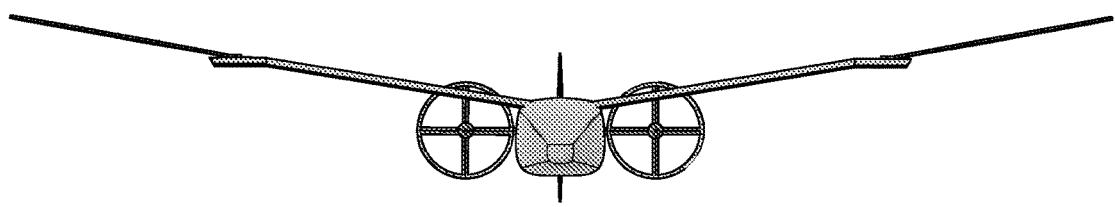
FIG. 16 is a front view of the MonoWing embodiment in cruise configuration with the wings set at 10 degrees dihedral, the Wingtips at zero-degree dihedral, and the rotor blades set at 10 degrees dihedral relative to the wingtip. The flaps are full up, the ducted-fans are shown tilted forward to provide cruise thrust, and the landing gear is retracted, according to one or more embodiments.
Figure 17:
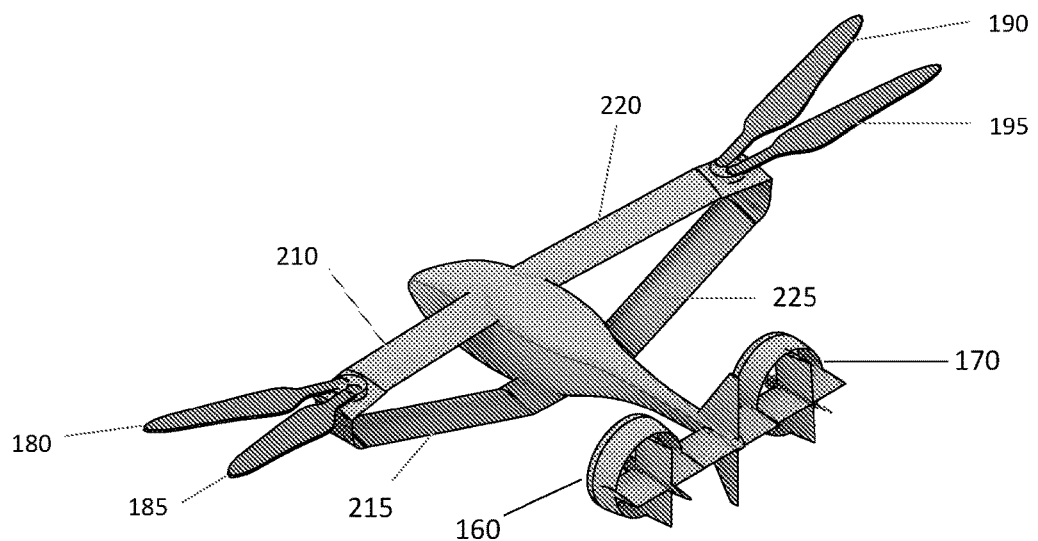
FIG. 17 is a rear isometric view of the aircraft in cruise configuration in the Joined-Wing embodiment with swept upper wings, swept lower wings connected by Winglets, tail propulsors tilted forward, and two bladed rotors in the "V" fixed-wing position, according to one or more embodiments.
Figure 18:
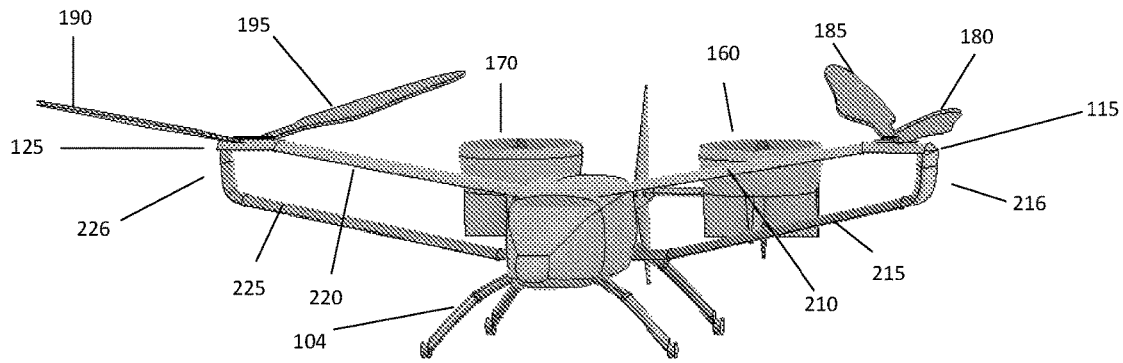
FIG. 18 is a front isometric view of the aircraft in the Joined-Wing embodiment showing the upper and lower wings connected by the Winglets. It is in the VTOL configuration with two bladed Rotorons, with the tail propulsors in the vertical position, and the landing gear extended, according to one or more embodiments. The left and right Joined-Wings also employ Leading-Edge, First-Flaps, and Trailing-Edge Flaps and are physical and functional mirror images of each other.
Figure 20:
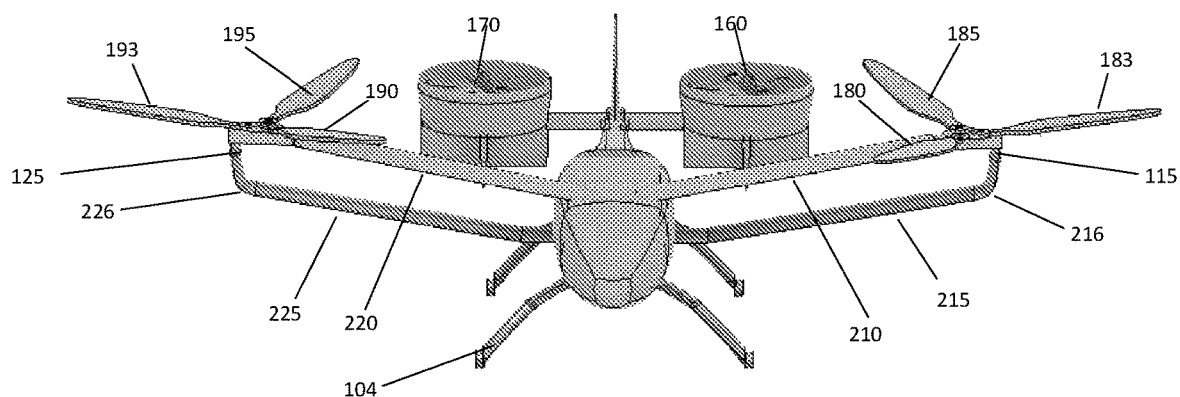
FIG. 20 is a front isometric view of a Joined-Wing aircraft in VTOL configuration with three-bladed rotorons in the rotor-wing configuration, ducted-fans in vertical thrust position, and articulating landing gear extended, according to one or more embodiments.

To operate in VTOL Mode, the Rotor Control Assemblies move the rotor blades from the 30° angular separation or fixed-wing configuration to either the 180° angular two-blade embodiment shown in FIG. 18, or the 120° angular separation three-blade embodiment as shown in FIG. 20. The tail mounted ducted-fans are oriented vertically as seen in FIGS. 1, 15, 18, and 20. The wing leading-edge flaps and trailing-edge flaps are moved to the full down position, as shown in FIGS. 1 and 15, to reduce the area of the wings impinged by rotor down wash. All electric propulsors are powered up, and as sufficient thrust is created the aircraft takes off vertically. In VTOL hover mode a combination of control features enables the aircraft to move up and down, to rotate about the yaw, pitch, and roll axes, and translate forward, backward, and laterally. Altitude is controlled by varying the vertical thrust provided by the combined wingtip rotors and tail propulsors. Yaw movement about the vertical axis is controlled by the vertically oriented tail propulsor's rudders deflecting the airflow left or right; Roll movement about the longitudinal axis, is controlled by varying the thrust of the wingtip rotors individually; pitch movement about the lateral axis is maintained by increasing or decreasing tail propulsor thrust to raise or lower the tail. The tail propulsors can rotate around their lateral axes from 5 degrees below the horizontal plane to 10 degrees aft of the vertical plane. The aircraft can move fore and aft by tilting the ducted-fans slightly forward or backward from vertical. The aircraft can move laterally by simultaneously changing the vertical lift of the wingtip rotors and ducted-fans on the same side of the aircraft combined with judicious use of opposite side ducted fan rudders. The wings are set at 100 dihedral from the horizontal, and the wingtips are set at 5° dihedral from the horizontal. This places the downwash at a 5° angle from vertical outward from the fuselage. This reduces the turbulence of the downwash immediately below the aircraft and minimizes disruption of ground operations under the aircraft in hover.

VTOL Mode: In VTOL hover mode, with no lift produced by the wings, the location of the mean aerodynamic center is determined by the variation in the thrust created by the wingtip Rotorons and the ducted fans. The wingtip Rotorons produce approximately 85% of the total VTOL thrust and the ducted-fans produce the other 15%. In balanced hover, the combined vertical thrust is such that the mean aerodynamic center is at the center of gravity of the aircraft. When the thrust of the ducted-fans is increased, the thrust balance point, i.e., the mean aerodynamic center moves slightly aft of the aircraft center of gravity. This creates a torque moment about the lateral axis through the center of gravity, causing the tail to lift up and the nose to pitch down. The Rotoron thrust vector is now pointing slightly forward which adds a forward horizontal component to the Rotoron thrust vectors, and creates forward velocity. To maintain altitude or to begin a climb, the Rotorons increase vertical thrust as needed, which further increases the forward velocity. The tail propulsors begin to smoothly tilt forward toward the horizontal, which reduces the vertical thrust component while increasing the forward thrust component. This rapidly increases airspeed, but also reduces the lift on the tail which lowers the tail and brings the nose of the aircraft back up. The increasing airspeed increases the lift of the main wings, thus reducing the lift required of the Rotorons. Simultaneously, the wing camber is moderated to manage the wing lift and flap drag referencing to the aircraft's forward velocity and angle of attack. Camber is reduced rapidly at first to minimize frontal drag, then on a schedule to maintain best lift over drag as speed increases. The ducted-fans are close to the fully horizontal position before wing stall speed is reached. At a specified, comfortable percentage above stall speed the wings are providing the full lift requirements, therefore the Rotorons are no longer needed for lift. At this point the Rotor Control Assembly slows the rotors to a stop and moves them to the V-wing position with the forward blade stopping in a forward-facing position at approximately 15 degrees forward of the wingtip and the retreating blade in a position approximately 15 degrees behind the wingtip as illustrated in FIGS. 2, 3, 6, 7.3, 8.1, 17 and 19. The blades are then locked in this position for cruise. At this point the ducted-fans are fully horizontal and providing all the forward thrust, the horizontal stabilizers and ducted fan elevators are trimmed such that they provide the lift needed to balance the center of lift with the center of gravity, and the aircraft is fully in cruise mode.

Cruise Mode: In cruise flight, the aircraft functions in the same manner as a fixed wing aircraft. The ducted-fans provide the cruise thrust; roll control is provided by varying the lift of the V-wing Rotoron blades and by varying the camber of the main wings; pitch control is provided by varying the lift of the horizontal stabilizers; yaw control is provided by varying the lateral thrust of the vertical stabilizers and the ducted fan rudders.

In addition to acting as ailerons, and providing enough lift to counteract its own weight, the Rotorons can reduce wingtip vortex drag to some degree. In cruise flight the spiral vortex from the lead Rotoron blade impinges on the spiral vortex of the trailing blade. To reduce drag, the distance between the Rotoron blade tips is varied such that the downward spiral of the vortex from the front blade meets the upward spiral of the vortex of the trailing blade and reduces the total drag effect to some degree. To move the point at which the vortices impinge, the Rotor Control Assembly decouples the Wheels to allow them to move independently. The Drive Gear and Guide Gear Motors then turn slowly in opposite directions to vary the distance between the blade tips and the point at which the downward spiral vortex from the forward blade impinges on the upward spiral vortex of the aft blade. The Drive and Guide Gears are then locked into that position. In summary, the additional lift, improved roll control, and reduced vortex drag provided by the Rotorons creates positive benefits during fixed-wing cruise, greatly improves the efficiency of cruise flight, and is a marked improvement over prior art.

Cruise to VTOL Transition: To transition from cruise flight back to vertical flight, the aircraft slows to a specified speed above stall and begins increasing the wing camber. At the specified speed the Rotor Control Assembly moves the Rotoron blades back into the rotor-wing position. After the Rotoron Blades are locked into the rotor-wing position, both Drive Motors engage to bring the rotors up to speed. Simultaneously the tail propulsors begin tilting up toward the vertical increasing total vertical lift. The flaps continue to lower toward full-down position as the aircraft slows to enter into a hover for VTOL operations and a vertical landing. Alternatively, as the aircraft reduces speed, the Rotorons can be brought to the rotor-wing position and not powered up. The ducted fans are left in the horizontal position and the Rotorons can freewheel in autogyro mode during descent. The advantage to this procedure is that the Rotor Control Motors can now be used as generators to recharge the supercapacitors and batteries and provide extra energy for the ensuing VTOL operations and landing.

The Joined Wing configuration can prove beneficial for heavier loads. Traditionally high-aspect ratio wings can carry less load supporting structure simply because they are usually thinner. However, a Joined-Wing arrangement provides much better structural support, and provides more wing area. A heavier load can be carried with this configuration while maintaining the benefits of high-aspect ratio wings.

Figure 19:
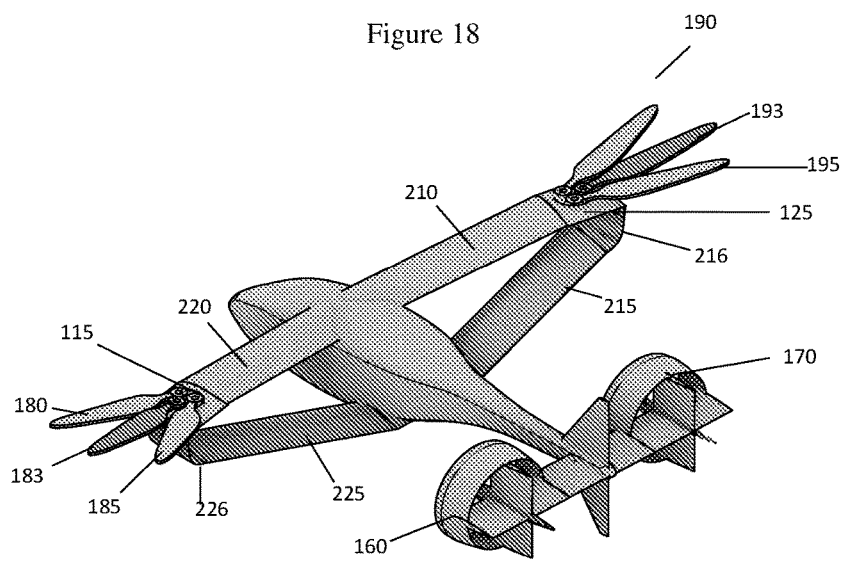
FIG. 19 is a left rear isometric view of a Joined-Wing embodiment of the aircraft in cruise mode with three-bladed Rotorons oriented in fixed-wing configuration as ailerons, with tail mounted propulsors in the horizontal orientation, and with landing gear retracted, according to one or more embodiments.

The Three Bladed Rotoron configuration in FIG. 19 can be more beneficial with heavier payloads since the total payload weight is distributed over six blades instead of four, reducing the stresses per blade.

Figure 21:
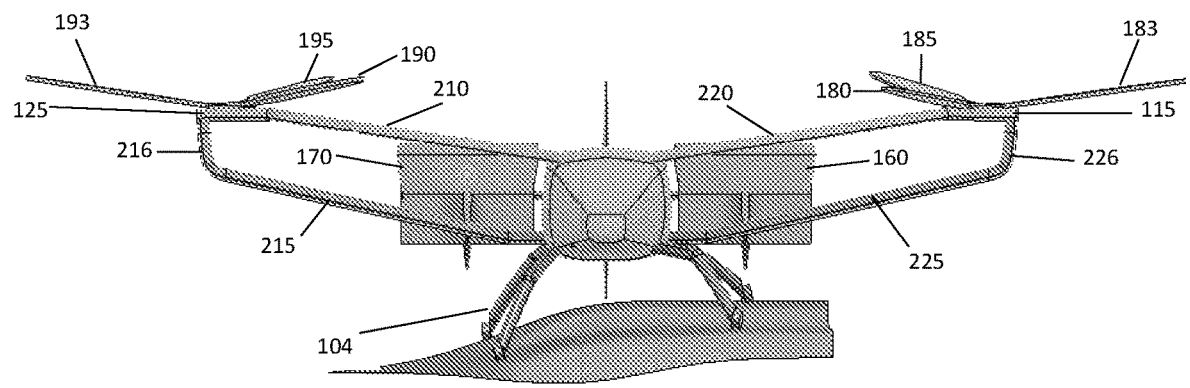
FIG. 21 is a front view of a Joined-Wing embodiment of the aircraft in VTOL configuration with a three-bladed rotorons in rotor-wing configuration, tail propulsors in vertical mode, and landing gear extended showing how the articulated landing gear keeps the fuselage level on an uneven landing surface.

The preferred embodiment of articulating landing gear is most beneficial during landings on unprepared, uneven, or rough surfaces as depicted in FIG. 21. This greatly improves safety when landing in such environments by reducing the potential for roll-over, and is beneficial for off-loading and up-loading personnel and cargo.

Figure 22:
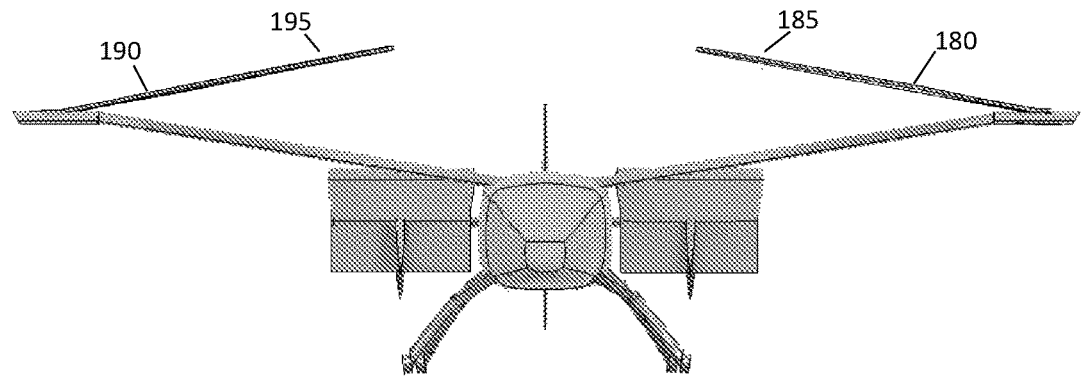
FIG. 22 is a front view of a two-blade MonoWing embodiment with articulated landing gear extended, tail propulsors vertical, flaps up, Wingtips at zero dihedral, Rotorons at 10° dihedral and positioned inward in Parked configuration.
Figure 23:
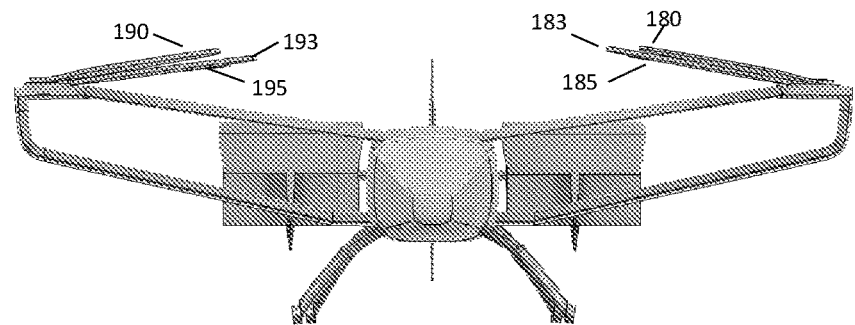
FIG. 23 is a front view of a three-blade Joined-Wing embodiment with articulated landing gear extended, tail propulsors vertical, flaps up, Wingtips at zero dihedral, and Rotorons positioned inward in Parked configuration

The capability to position the Rotorons over the wings when parked, as shown in FIGS. 22 and 23, can be beneficial in locations where parking area is restricted such as aboard a ship, in a forest or jungle clearing with limited space, at an urban verti-port, or any area where wingtip clearance is an issue.

The capability to establish the wingtip dihedral at 5° relative to the horizontal plane results in the rotor downwash being partly directed outboard during VTOL operations. If the ducted-fan rudders are simultaneously used to divert the tail downwash outboard, this results in much less turbulence directly beneath the aircraft and greatly improves the environment for ground operations conducted directly below the aircraft during hover. Although slightly more power is required due to the angled vertical thrust, the disadvantage of additional power may be well overtaken by the advantages of decreased turbulence on ground operations.

Standard construction methods and materials can be used to build this aircraft. All processes and procedures are common and recognizable to anyone familiar with the art. The fuselage, wings, control surfaces, and rotor blades can be made with traditional aircraft metals or composite materials. In the preferred embodiment the aircraft is constructed primarily of carbon-fiber and other high strength, lightweight composite materials. Rotor Control Assemblies, flight control elements, and other elements subject to high stress can be constructed of stainless steel or other high strength materials well known to those skilled in the art. Higher gross weight embodiments of this aircraft will require comparatively higher strength materials. Rotor Control Assembly Motors and tail mounted propulsors comprise electric motors and motor controllers of one or more embodiments. The preferred embodiment for the Blade Control Assemblies comprises large diameter 'pancake-style', AC Synchronous Motors with high power to weight ratios, controlled with Variable Frequency Drives. The preferred embodiment for the tail propulsors comprises smaller diameter 'can-style' AC Synchronous Motors with high power to weight ratios, controlled with Variable Frequency Drives.

I claim the following:

1. A Rotor Control Assembly for an aerial vehicle capable of vertical takeoff and landing in rotor-wing mode, rotor-wing vertical flight operations, and horizontal flight operations in fixed-wing mode, wherein the aerial vehicle comprises a wing having a wingtip, the rotor control assembly comprising a Power Section having: a lower drive gear; a hollow drive shaft axially mounted to the center of said lower drive gear, said drive shaft rotatably mounted in said wingtip; an electric motor and associated controls to power said drive gear; an electric slip ring operably mounted within said drive shaft to provide power and signal paths to and from electric actuators within a plurality of rotoron blades; an upper guide gear; a hollow guide shaft axially mounted to the center of the guide gear and concentrically mounted onto said drive shaft; an electric motor and associated controls to power said guide gear; a device to latch and hold said drive gear in place; a device to latch and hold said guide gear in place; two spring-loaded coupler locks, wherein each of said spring-loaded coupler locks directly engages with said drive gear and said guide gear to couple said drive gear and said guide gear together as a single unit when operating the rotoron blades as rotors during rotor-wing flight operations and when operating the rotoron blades as extended ailerons during fixed-wing flight operations, and to decouple said drive gear and said guide gears during a process in which said aerial vehicle transitions from a vertical flight configuration to a horizontal flight configuration; an electric actuator for each of said spring-loaded coupler locks; and a gear cover providing protection for said drive gear and said guide gear.

2. The Rotor Control Assembly of claim 1, further comprising a Blade Positioner Section having: an aft concentric blade disk axially centered and affixed perpendicular to the top end of said drive shaft; and a forward concentric blade disk axially centered and affixed perpendicular to the top end of said concentric guide shaft.

3. The Rotor Control Assembly of claim 1, further comprising a Blade Positioner Section having: a two-blade guide plate axially connected to said guide shaft and comprising a raised outer rim at the outer diameter of the guide plate, a raised inner rim surrounding the rotational center of the guide plate; said outer rim having cut along a specified section of its inner edge an aft arcuate rack; said inner rim having cut along a specified section of its outer edge a forward arcuate rack; a two-blade Drive Plate having a forward rotoron blade axle mounting hole and an aft rotoron blade axle mounting hole, each cut radially at a specified distance from the rotational center of said two-blade Drive Plate, each of said mounting hole separated by an azimuthal angle of 180 degrees; said two-blade Drive Plate axially affixed at its center to the drive shaft; a forward rotoron blade axle rotatably mounted in said forward rotoron blade mounting hole and able to rotate freely inside said forward rotoron blade mounting hole about an axis parallel to the vertical axis of said drive shaft; an aft rotoron blade axle rotatably mounted in said aft rotoron blade mounting hole and able to rotate freely inside said aft rotoron blade mounting hole about an axis parallel to the vertical axis of said drive shaft; a forward pinion gear operably affixed to the bottom of said forward rotoron blade axle and operably meshed into said forward arcuate rack of said two-blade guide plate; said forward rotoron blade axle operably affixed to one of the plurality of rotoron blades; said forward rotoron blade axle operably rotatable in said forward rotoron blade mounting hole to and from a specified "V" shaped fixed-wing position in horizontal cruise flight and a 180-degree rotor-wing position in vertical flight by the movement of said forward pinion gear across said stationary forward arcuate rack as said two-blade drive plate rotates in relation to the two-blade guide plate; an aft pinion gear operably affixed to the bottom of said aft rotoron blade axle and operably meshed into said aft arcuate rack of said two-blade guide plate; said aft rotoron blade axle operably affixed to another of the plurality of rotoron blades; said aft rotoron blade axle operably rotatable in said aft rotoron blade mounting hole to and from a specified "V" shaped fixed-wing position in horizontal cruise flight and a 180-degree rotor-wing position in vertical flight by the movement of said stationary aft arcuate rack across said aft pinion gear as said two-blade drive plate rotates in relation to the two-blade guide plate.

4. The Rotor Control Assembly of claim 1, further comprising: a three-blade guide plate axially fixed at its center of rotation to said guide shaft and comprising a raised outer rim at the outer diameter of the guide plate, a raised inner rim surrounding the rotational center of the guide plate; said outer rim having cut along a specified section of its inner edge an aft arcuate rack; said inner rim having cut along a specified section of its outer edge a forward arcuate rack; said three-blade Drive Plate having a forward mounting hole, a center mounting hole, and an aft mounting hole, each of said mounting holes being radially disposed a specified distance from the rotational center of said three-blade Drive Plate, each of said mounting holes being separated by an azimuthal angle of 120 degrees; said three-blade Drive Plate axially affixed at its center to said drive shaft; a forward rotoron blade axle rotatably mounted in said forward mounting hole and able to rotate freely inside said forward mounting hole about an axis parallel to the vertical axis of said drive shaft; an aft rotoron blade axle rotatably mounted in said aft mounting hole and able to rotate freely inside said aft mounting hole about an axis parallel to the vertical axis of said drive shaft; a center rotoron blade axle operably fixed in said center mounting hole and rigidly affixed to said three-blade Drive Plate at a specified azimuth and fixed angular position; said center, forward, and aft rotoron blade axles each operably fixed to a respective one of the plurality of rotoron blades; said forward and aft rotoron blade axles free to rotate in their respective mounting holes about an axis parallel to the vertical axis of said drive shaft; a forward pinion gear affixed to the bottom of said forward rotoron blade axle; an aft pinion gear affixed to the bottom of said aft rotoron blade axle; said forward pinion gear meshed into said forward arcuate rack; said aft pinion gear meshed into said aft arcuate rack; said rigidly mounted center rotoron blade axle fixed at a specified azimuth during all operations; said forward and aft rotoron blade axles able to rotate in said forward and aft mounting holes respectively from a specified V-Wing position to a 120-degree vertical flight position as said forward and aft pinions move across said forward and aft arcuate racks respectively.

5. An aerial vehicle in the Convertiplane category capable of vertical takeoff and landing in rotor-wing mode, rotor-wing vertical flight operations, and horizontal flight operations in fixed-wing mode comprising: a fuselage comprising right and left sides, a cockpit section, a payload section, a power generation section, a tail section, a vertical axis, a longitudinal axis, and a lateral axis; a left-wing assembly set at a positive dihedral, comprising a variable camber mechanism, and extending from said left side of said fuselage; a left wingtip extending from the outer end of said left wing assembly said left wingtip set at a lesser positive dihedral than said left wing and comprising a left Rotor Control Assembly according to claim 1, which controls the azimuthal angular relationship of multiple co-planar left rotoron blades about the central vertical axis of said left Rotor Control Assembly; wherein the multiple co-planar left rotoron blades are rotatably attached to said left Rotor Control Assembly, said left rotoron blades producing vertical thrust during rotor-wing flight operations and producing added lift and added roll control during fixed-wing flight operations; a right wingtip extending from the outer end of said right wing assembly said right wingtip set at a lesser positive dihedral than said right wing and comprising a right Rotor Control Assembly according to claim 1, which controls multiple coplanar right rotoron blades; wherein the multiple coplanar right rotoron blades are rotatably attached to said right Rotor Control Assembly, said right rotoron blades producing vertical thrust during rotor-wing flight operations and producing added lift and added roll control during fixed-wing flight operations; a left horizontal stabilizer extending outward from the left side of said tail section and being rotatable to provide pitch control about a lateral axis extending through said left horizontal stabilizer and said fuselage tail section and being perpendicular to said fuselage longitudinal axis; a right horizontal stabilizer extending outward from the aft right side of said fuselage and being rotatable to provide pitch control about a lateral axis extending through said right horizontal stabilizer and said tail section and being perpendicular to said fuselage longitudinal axis; a left propulsor comprising a ducted fan, said ducted fan comprising an electric motor housing, an electric motor, multi-bladed propellers rotatably affixed to said electric motor, horizontal and vertical guide vanes affixed to the aft end of said electric motor housing and said duct, said horizontal and vertical guide vanes functioning as aerodynamic elevators and rudders respectively; said left propulsor affixed to the outer end of said left horizontal stabilizer, and rotatable in the vertical plane about said lateral axis to provide both vertical flight thrust and cruise flight thrust; a right propulsor comprising a ducted fan, said ducted fan of said right propulsor comprising an electric motor housing, an electric motor, multi-bladed propellers rotatably affixed to said electric motor, horizontal and vertical guide vanes affixed to the aft end of said electric motor housing and said duct, said horizontal and vertical guide vanes of said right propulsor functioning as aerodynamic elevators and rudders respectively; said right propulsor affixed to the outer end of said right horizontal stabilizer, and rotatable in the vertical plane about said lateral axis to produce both vertical flight thrust and horizontal cruise flight thrust; a dorsal vertical stabilizer aligned with said fuselage vertical axis, comprising a front stabilizer section and an aft rudder section, and being affixed to the top of said aft end of said tail section; a ventral vertical stabilizer aligned with said fuselage vertical axis, comprising a front stabilizer section, and an aft rudder section, and being affixed to the bottom of said aft end of said tail section; and a landing gear assembly to enable takeoffs, landings, and ground operations, said landing gear assembly comprising independently actuated articulating legs with wheels and tires operably mounted to the outer end of said legs via a joint that is sufficiently rotatable to allow the plane of the wheels to vary from vertical to horizontal such that the wheels and tires can also function as landing pads.

6. The aerial vehicle of claim 5, wherein said left wing assembly comprises an outer end-connected swept biplane and said right wing assembly comprises an outer end-connected swept biplane.

7. The aerial vehicle of claim 5, wherein said left wing assembly comprises a monoplane wing, and said right wing assembly comprises a monoplane wing.

8. The aerial vehicle of claim 5, wherein the power generation section comprises: a hybrid power plant comprising a motor which spins a generator, said generator producing the electric power needed by said aerial vehicle; batteries, and supercapacitors.

9. The aerial vehicle of claim 5, wherein the payload section may be configured for cargo, may be configured to carry and support passengers, or both.

10. The aerial vehicle of claim 5, further comprising a wing camber control mechanism that changes the shape of the airfoil of said left wing and said right wing, said right wing being a physical and functional mirror image of said left wing, each of said left wing and right wing comprising no adaptive technology, no morphing materials, no flexible skins, and no piezoelectric actuators; each of said left wing and right wing comprising a center-wing section comprising a skeletal wing structure comprising a cylindrical fore spar, a cylindrical aft spar, and a plurality of center-wing ribs; said plurality of center-wing ribs affixed perpendicularly to the longitudinal axis of said fore spar and said aft spar; center-wing skin covering the skeletal wing structure to form the center-wing; a leading-edge flap comprising a plurality of evenly spaced leading-edge flap ribs, said leading-edge flap ribs having a rounded, small-radius front end and a rounded, larger-radius aft end; leading-edge flap skin affixed to said evenly spaced leading-edge flap ribs to form the leading-edge flap; said leading-edge flap being rotatably hinged coaxially to said center-wing fore spar such that said leading-edge flap can rotate about the cylindrical axis of said fore spar in the manner of a hinge; leading-edge vortex generators comprising a plurality of small triangular extensions of the leading edge flap skin spaced along an upper aft longitudinal edge of said leading-edge flap skin where said leading-edge flap skin meets an upper surface of said center wing skin when said leading-edge flap rotation angle is zero, and pointing aft such that when said leading-edge flap rotates downward about the fore spar, said leading-edge vortex generators on an upper aft edge of said leading-edge flap rotate upward to be able to generate vortices over the center wing; said center-wing skin having recesses along a front edge thereof which match the shape of said leading-edge vortex generators such that said leading-edge vortex generators fit flush within said center-wing skin recesses when said leading-edge flap angle is zero; a first-flap comprising a plurality of first-flap ribs, said first-flap ribs having rounded front ends of a specified radius and rounded aft ends of a smaller radius; said first-flap rib front ends rotatably hinged and evenly spaced along the center-wing cylindrical aft spar such that said first-flap rotates about said center-wing cylindrical aft spar in the manner of a hinge; said first-flap ribs further comprising transverse holes in the smaller radius aft ends of said first-flap ribs through which is rotatably mounted a first-flap spar; first-flap vortex generators comprising a plurality of triangular extensions pointing forward and evenly spaced along a top forward edge of said first-flap skin that meets with a top aft edge of said center-wing skin when said flap rotation angle is zero, such that when the first-flap is rotated downward, said first-flap vortex generators rotate upward to be able to generate vortices over the first-flap; said center-wing skin having triangular recesses along its top aft edge matching the shape of said first-flap vortex generators such that said first-flap vortex generators fit flush with the top aft edge of said center-wing skin when the rotation angle is zero; a trailing flap comprising a trailing flap spar, a plurality of trailing flap ribs, and a trailing flap skin, said trailing flap ribs being evenly spaced along and operably affixed perpendicularly to said trailing flap spar; said trailing flap spar being rotatably hinged to an aft end of the plurality of said first-flap ribs such that the trailing flap can rotate freely within the first-flap ribs about an axis parallel to a longitudinal axis of the first-flap in the manner of a hinge; trailing edge vortex generators comprising a plurality of triangular extensions pointing forward and being evenly spaced along a top front edge of said trailing flap that meets with a top aft edge of said first-flap skin when said trailing flap rotation angle is zero, such that when said trailing flap rotates downward toward the rear, said trailing flap vortex generators rotate upward to be able to generate vortices over said trailing flap; said first-flap skin having recesses along its top aft edge that match the shape of said trailing flap vortex generators such that said trailing flap vortex generators fit into said first-flap recesses and fit flush with the top aft edge of said first-flap skin when said trailing flap rotation angle is zero; a plurality of electric actuators and actuator controllers operably affixed within the center-wing; said plurality of electric actuators operably connected to a plurality of said leading-edge ribs such that actuation of said electric actuators causes said leading-edge flaps to rotate; a plurality of non-stretchable flap connectors cross-connecting a plurality of said leading-edge ribs to a plurality of said first-flap ribs such that when said leading-edge flaps rotate in one direction, said first-flaps rotate in the counter direction; a plurality of flexible, non-stretchable rib connectors cross-connecting a plurality of said center-wing ribs to a plurality of said trailing ribs such that when the first-flap rotates, causing the trailing flap spar to rotate in the same direction, said rib connectors cause said trailing flap to rotate in the same direction as the first-flap but at a greater angle, thus increasing a camber of said airfoil and smoothing a profile of said airfoil.

11. The aerial vehicle of claim 5, wherein each of said left rotoron blades and right rotoron blades further comprises a Rotoron Blade camber control mechanism that changes the shape of the airfoil of said rotoron blades, with said right rotoron blades being physical and functional mirror images of said left rotoron blades, the Rotoron Blade camber control mechanism comprising: a central blade spar with mounting elements provided along a front edge thereof to accommodate a hinged leading-edge flap spar; said central blade spar further comprising mounting elements along an aft edge thereof to accommodate a hinged trailing-edge flap spar; said central blade spar further comprising a mounting element at its base to affix said central blade spar to a corresponding one of said left Rotor Control Assembly or said right Rotor Control Assembly; said central blade spar having provision in specified hollow locations to position one or more electric camber actuators which connect to and rotate said trailing-edge flap spar or a trim-flap spar; a leading-edge flap comprising a leading-edge flap skin, a leading-edge spar, and a plurality of ribs with rounded front ends of very small radius and rounded aft ends of larger radius, said aft ends having transverse holes to accommodate the leading-edge spar as a hinge pin; the aft end of said leading-edge flap operably hinged to a front longitudinal edge of said central blade spar, using said leading-edge spar as a hinge pin such that the leading-edge flap rotates in the manner of a hinge; a trailing-edge flap comprising a trailing-edge flap skin, the trailing-edge flap spar, and a plurality of trailing-edge flap ribs with tapered aft ends and rounded front ends, said rounded front ends having transverse holes to accommodate the trailing-edge flap spar as a hinge pin; a front edge of said trailing-edge flap operably hinged to an aft longitudinal edge of said central blade spar, using said trailing-edge flap spar as a hinge pin such that the trailing-edge flap rotates in the manner of a hinge; a plurality of flexible, non-stretchable flap connectors cross-connecting said leading-edge flap to said trailing-edge flap such that when said leading edge flap rotates, said trailing-edge flap rotates in the counter direction thus changing the camber of said left rotoron blade or said right rotoron blade.

12. The aerial vehicle of claim 11, wherein the trim-flap comprises: a plurality of shortened trailing-edge flap ribs located a specified distance toward the outer end of said trailing-edge flap, said shortened trailing-edge flap ribs having transverse mounting holes in the aft ends such that a trim-flap spar can be rotatably connected through said transverse mounting holes; a trim-flap comprising a trim-flap spar, a plurality of trim-flap ribs, and a trim-flap skin covering said trim-flap ribs, said trim-flap being rotatably hinged to said shortened trailing flap ribs on an axis parallel to the longitudinal axis of said trailing-edge flap, using said trim-flap spar as a hinge pin; a plurality of flexible trim-flap connecters connecting said electric camber actuators to said trim-flap such that said camber actuators can cause said trim-flap to rotate about said trim-flap spar, such that deflection of the trim-flap under airflow causes rotation of the attached Trailing-Edge Flap, and via the flexible cross-connectors, counter-rotation of the Leading-Edge Flap.

* * * * *